(12) United States Patent
Hodges et al.

(10) Patent No.: US 10,079,001 B2
(45) Date of Patent: Sep. 18, 2018

(54) AUTONOMOUS PIXEL WITH MULTIPLE DIFFERENT SENSORS

(71) Applicant: Microsoft Technology Licensing, LLC, Redmond, WA (US)

(72) Inventors: Stephen Edward Hodges, Cambridge (GB); Nicholas Yen-Cherng Chen, Cambridge (GB); David Sweeney, Cambridge (GB); Anja Thieme, Cambridge (GB); Tobias Grosse-Puppendahl, Cambridge (GB); Helene Steiner, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 15/257,873

(22) Filed: Sep. 6, 2016

(65) Prior Publication Data
US 2017/0352327 A1 Dec. 7, 2017

(30) Foreign Application Priority Data

Jun. 6, 2016 (GB) .................................. 1609877.4

(51) Int. Cl.
*G09G 5/00* (2006.01)
*G09G 5/10* (2006.01)
(Continued)

(52) U.S. Cl.
CPC .................. *G09G 5/10* (2013.01); *G09G 3/02* (2013.01); *G09G 3/20* (2013.01); *G09G 3/2088* (2013.01); *G09G 3/344* (2013.01); *G09G 5/006* (2013.01); *G06F 3/0412* (2013.01); *G09G 2300/0473* (2013.01); *G09G 2300/0833* (2013.01); *G09G 2320/0626* (2013.01); *G09G 2340/0407* (2013.01); *G09G 2360/141* (2013.01);
(Continued)

(58) Field of Classification Search
CPC .............. G09G 5/10; G09G 2360/144; G09G 2320/0626; G09G 3/02; G09G 5/006; G09G 3/2088; G09G 3/344; G09G 3/20; G09G 2380/14; G09G 2300/0473; G09G 2360/142; G09G 2360/141; G09G 2340/0407; G06F 3/0412
See application file for complete search history.

(56) References Cited

U.S. PATENT DOCUMENTS

| 5,625,210 A | 4/1997 | Lee et al. |
| 6,243,155 B1 | 6/2001 | Zhang et al. |

(Continued)

OTHER PUBLICATIONS

Salomon, et al., "Active Pixel Sensors for Autonomous Spacecraft Applications", In Proceedings of SPIE, Space Sciencecraft Control and Tracking in the New Millennium, vol. 2810, Oct. 28, 1996, pp. 166-175.

(Continued)

Primary Examiner — Muhammad N Edun

(57) ABSTRACT

An autonomous pixel comprises a display element, a plurality of different sensors and a control element. The sensors are arranged to detect one or more external stimuli and the control element is arranged to generate, entirely within the autonomous pixel, a control signal to drive the display element based, at least in part, on a magnitude of an external stimulus detected by one or more of the different sensors.

20 Claims, 15 Drawing Sheets

(51) Int. Cl.
  *G09G 3/02* (2006.01)
  *G09G 3/20* (2006.01)
  *G09G 3/34* (2006.01)
  *G06F 3/041* (2006.01)

(52) U.S. Cl.
  CPC . *G09G 2360/142* (2013.01); *G09G 2360/144* (2013.01); *G09G 2360/148* (2013.01); *G09G 2380/14* (2013.01)

(56) References Cited

U.S. PATENT DOCUMENTS

| | | | |
|---|---|---|---|
| 6,384,804 | B1 | 5/2002 | Dodabalapur et al. |
| 7,601,942 | B2 | 10/2009 | Underwood et al. |
| 8,537,149 | B2 | 9/2013 | Fann et al. |
| 8,553,019 | B2 | 10/2013 | Vogsland |
| 8,749,529 | B2 | 6/2014 | Powell et al. |
| 9,153,171 | B2 | 10/2015 | Sakariya et al. |
| 2003/0210236 | A1 | 11/2003 | Martin et al. |
| 2005/0270260 | A1 | 12/2005 | Pelzer et al. |
| 2007/0035490 | A1 | 2/2007 | Johnson et al. |
| 2007/0229424 | A1 | 10/2007 | Hayashi et al. |
| 2007/0257184 | A1* | 11/2007 | Olsen ............. G02B 3/0062 250/208.1 |
| 2010/0315394 | A1 | 12/2010 | Katoh et al. |
| 2011/0018850 | A1 | 1/2011 | Uehata et al. |
| 2014/0132530 | A1* | 5/2014 | Suh ............. G06F 3/0412 345/173 |
| 2014/0354905 | A1 | 12/2014 | Kitchens et al. |
| 2016/0088088 | A1 | 3/2016 | van Eyken et al. |
| 2016/0227135 | A1* | 8/2016 | Matolin ............. H04N 3/155 |

OTHER PUBLICATIONS

"International Search Report and Written Opinion Issued in PCT Application No. PCT/US2017/034902", dated Aug. 29, 2017, 11 Pages.

* cited by examiner

AUTONOMOUS PIXEL WITH MULTIPLE DIFFERENT SENSORS

BACKGROUND

Current displays use complex electronics, row/column drivers for the pixels and timing circuitry in order to render images on the display. Use of row/column drivers makes it difficult to construct displays on non-developable surfaces. A developable surface is one which can be flattened onto a plane without distortion and hence a non-developable surface (e.g. a spherical surface) is one which cannot be flattened onto a plane without distortion. This is similar to the problem experienced when projecting maps of the globe onto a plane.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An autonomous pixel comprises a display element, a plurality of different sensors and a control element. The sensors are arranged to detect one or more external stimuli and the control element is arranged to generate, entirely within the autonomous pixel, a control signal to drive the display element based, at least in part, on a magnitude of an external stimulus detected by one or more of the different sensors.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
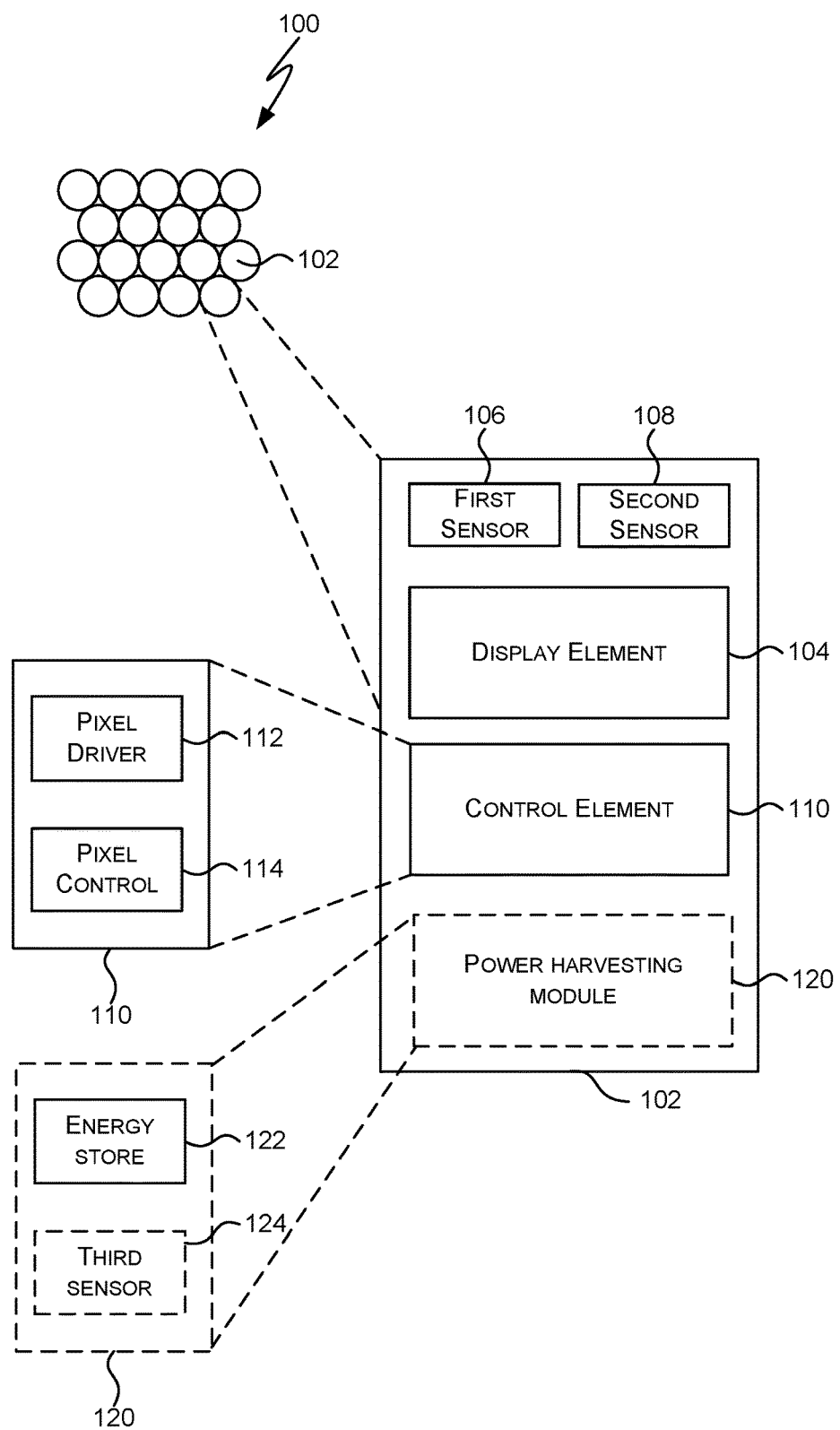
FIG. 1 is a schematic diagram showing a portion of a display comprising a plurality of autonomous pixels.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, the use of row/column drivers makes it difficult to construct displays on non-developable surfaces. The use of row/column drivers means that displays typically comprise a regular or rectilinear array of pixels. The embodiments described below are not limited to implementations which solve any or all of the disadvantages of known displays.

Described herein is an autonomous, self-contained pixel that comprises a display element, a plurality of different sensors and a control element. Each sensor detects an external stimulus and the different sensors within an autonomous pixel may detect different external stimuli and/or have different sensing properties (e.g. the sensors may be a different physical size, shape, orientation and/or be made from a different sensing material). The control element receives a signal from one or more of the plurality of different sensors and generates a control signal based, at least in part, on a magnitude (e.g. level or amplitude) of an external stimulus as detected by the one or more of the plurality of different sensors. The control signal which is generated within the pixel by the control element is used to control the state of the display element (e.g. to control whether it is black or white or to control the color of the pixel where it is a color or greyscale display) and therefore the magnitude of the external stimulus local to the pixel determines the visual appearance of the display element (and hence the pixel).

The autonomous pixels described herein may be used to form a display (where a display comprises a plurality of autonomous pixels) and therefore the magnitude of the external stimulus across the display (as detected locally by each autonomous pixel) determines the visual appearance of the display, i.e. the magnitude of the external stimulus across the display determines the visual information displayed on the display. All the autonomous pixels within a display may all be the same or the display may comprise a plurality of different autonomous pixels (e.g. autonomous pixels comprising different types and/or combinations of sensors). For example, a display may comprise a number of autonomous pixels comprising a touch sensor and an infra-red sensor and a number of pixels comprising a sensor which detects visible light and an infra-red sensor, with the infra-red sensor being used in all pixels to provide "control data" (as described in detail below). This enables part of the display to be touch-sensitive or enables coarse touch-sensing (e.g. where there fewer touch-sensitive pixels than those sensitive to visible light). In another example, a display may comprise a number of different pixels which are sensitive to different wavelengths of visible light (e.g. such that they may receive the same "image data" but different "control data").

The pixels described herein are referred to as being autonomous because they operate independently (i.e. without requiring drive signals from central driver circuitry) and the signals which are used to control each pixel are generated locally, i.e. entirely within the pixel itself. The external stimulus may comprise ambient signals incident upon the sensor device and/or an applied signal or stimulus which is applied in the region of the pixel itself and in various examples the different sensors within a pixel may be arranged to detect different external stimuli. Using the autonomous pixels described herein, visual information (e.g. an image or text) can be "written" directly on to a display using the external stimulus, e.g. a visible image may be rendered by applying the external stimulus (which may or may not be visible).

In some of the examples described below, the only electrical signals or connections which are provided to the pixels in the display are global electrical signals or connections (i.e. such that the same electrical signals or connections are provided to all the pixels in the display), e.g. a global power connection and a global ground connection. In others of the examples described below, there are no global electrical signals and instead power is generated within each autonomous pixel (i.e. using energy harvesting).

By constructing a display from autonomous, self-contained pixels, the pixels can be arranged in an arbitrary arrangement and are not limited to a regular or rectilinear grid. For example, the pixels may be randomly (or pseudo-randomly) arranged. This enables displays with a constant or controlled pixel density across the display to be formed on non-developable surfaces (e.g. such that the pixel density is independent of the topology in a particular region of the display). Additionally, as the pixels operate independently, images can be easily rendered onto the display through the provision of the external stimulus. Where this external stimulus comprises visible light, the display may act as a self-developing photographic surface. Using the autonomous pixels described herein, a display can be implemented with minimal electronic components and this may therefore enable a display to be thinner, more flexible, lighter, cheaper and/or easier to manufacture than traditional displays. It can also be fabricated using standard manufacturing techniques.

As the autonomous pixels comprise at least two different sensors, the resulting display may respond to different external stimuli (i.e. where the different sensors detect different external stimuli) and this may be used to provide different operating modes (e.g. one mode which updates the display in response to a first external stimuli and a second mode which updates the display in response to second, different, external stimuli or a first mode in which the display can be written to and a second mode in which the display can be erased) and/or to provide control data to the pixels without using a global electrical signal or connection (e.g. where "control data" is provided using a separate external stimulus to "image data", as described in more detail below). In addition to, or instead of, having at least two sensors that respond to different external stimuli, a pixel may comprise two or more different sensors that detect the same external stimulus but have different sensing parameters and this may be used to provide a pixel with variable sensitivity to the external stimulus or to tune the sensitivity in some way (e.g. to counteract variability caused by manufacturing).

For the purpose of the following description, different wavelengths of electromagnetic radiation are considered to be different external stimuli and so sensors with different wavelength responses are considered to be different sensors (and not sensors with different sensing parameters).

Any suitable display technology may be used and in many examples, the display may be an electronic paper display. The term 'electronic paper' is used herein to refer to display technologies which reflect light (like paper) instead of emitting light like conventional LCD displays. As they are reflective, electronic paper displays do not require a significant amount of power to maintain an image on the display and so may be described as persistent displays. A multi-stable display is an example of an electronic paper display. In some display devices, an electronic paper display may be used together with light generation in order to enable a user to more easily read the display when ambient light levels are too low (e.g. when it is dark). In such examples, the light generation is used to illuminate the electronic paper display to improve its visibility rather than being part of the image display mechanism and the electronic paper does not require light to be emitted in order to function.

The term 'multi-stable display' is used herein to describe a display which comprises pixels that can move between two or more stable states (e.g. a black state and a white state and/or a series of grey or colored states) and each pixel may therefore be referred to as a 'multi-stable display element' or 'multi-stable pixel'. Bi-stable displays, which comprise pixels having two stable states, are therefore examples of multi-stable displays. A multi-stable display can be updated when powered, but holds a static image when not powered and as a result can display static images for long periods of time with minimal or no external power. Consequently, a multi-stable display may also be referred to as a 'persistent display' or 'persistently stable' display.

FIG. 1 is a schematic diagram showing a part 100 of a display comprising a plurality of autonomous pixels 102. Each autonomous pixel 102 comprises a display element 104, a first sensor 106, a second sensor 108 and a control element 110, where the first and second sensors 106, 108 are different (e.g. in terms of sensing parameters and/or external stimulus which they sense). The display element 104 is an element which can be modified by the control element 110 (e.g. to change its color) in order to display visual information. As described above, each pixel 102 operates autonomously and so comprises its own control element 110 such that signals to control the display element 104 in a particular pixel 102 (e.g. to change the state of the display element) are generated entirely within that pixel 102 (and are not generated in centralized control circuitry). The control signal generated by a control element 110 is based, at least in part, on a level of an external stimulus detected by the first and/or second sensor 106, 108. Although FIG. 1 shows a pixel 102 comprising two sensors 106, 108, it will be appreciated that a pixel may comprise more than two sensors and any additional sensors within a pixel may be the same as the first sensor or the second sensor or may be different from both the first and second sensors.

In various examples, the display element 104 is an electronic paper display element (e.g. it may be multi-stable) and may, for example, comprise an e-ink (or similar) bead or a portion of an electrophoretic film with suitable electrodes arranged to move the contained pigment particles. Where a multi-stable film or ink is used, the film or ink may extend across many pixels with the display elements being defined by an arrangement of electrodes either side of the pigment particles. In another example, a multi-stable display element may comprise an electromechanical activated pixel (e.g. a flip-dot or flip-disc). Other electronic paper display technologies may alternatively be used, such as electrochromic or cholesteric liquid crystal displays. As described above, use of multi-stable display elements allows the display to retain an image once the electrical power required to change the image is removed.

In other examples, however, the display element 104 is not multi-stable and so requires a substantially constant power supply in order to be able to maintain its state (and hence in order that the display can continue to display an image). In such examples, the display element 104 may comprise an LED, OLED, electrowetting display or LCD (although it will be appreciated that there may be ways in which these technologies may also be used to provide a multi-stable display element).

The control element 110 in a pixel is arranged to control the display element 104 (in the same pixel) in response to an external stimulus detected by one or both of the sensors 106, 108, i.e. the control element 110 generates a control signal to drive the display element 104 based, at least in part, on the sensed magnitude of the external stimulus detected by one or both of the sensors 106, 108.

The sensors 106, 108 sense the local environment and in particular the external stimulus and the first and second sensors 106, 108 may be used to detect different external stimuli. As mentioned above, the external stimulus may comprise ambient signals incident upon the sensor device and/or an applied signal or stimulus which is applied in the region of the pixel itself or more widely (e.g. to groups of pixels or the entire display). The positioning of the sensors 106, 108 within the pixel 102 (e.g. in relation to the display element 104) may depend on the particular display element and external stimulus (or stimuli) used, i.e. whether the display element 104 is opaque to the stimulus being sensed (in which case the display element 104 cannot be between the sensors 106, 108 and a front surface of the display, i.e. the sensors 106, 108 cannot be directly behind the display element 104 and may instead be positioned adjacent to the display element) and/or whether the sensors 106, 108 are opaque to the signal being output by the display element 104 (in which case the sensors 106, 108 cannot be between the display element 104 and a front surface of the display, i.e. the sensors 106, 108 cannot be in front of the display element 104 and may instead be positioned adjacent to the display element). The front (or top) surface of the display is used herein to refer to the viewing surface (i.e. the surface on which an image is rendered) and is not intended to limit the possible orientation of the display itself (e.g. in use) which may be horizontal or vertical or at any other orientation and as described herein may be non-planar and in various examples may be non-developable.

The external stimulus may, for example, be visible light (i.e. visible light which is incident upon the display and in particular on the particular pixel 102). In other examples another external stimulus may be used such as other types of electromagnetic radiation (UV, infra-red, X-ray, microwaves, RF, etc., e.g. such that the display may be used to visualize any part of the electromagnetic spectrum), pressure (mechanical, acoustic, vibration, etc.), capacitance, electric and magnetic fields (or any other physical field that can be measured at each point in space), gravity, acceleration, fluid flow, temperature or chemicals. Where the external stimulus is light (or other types of electromagnetic radiation), the sensors may be sensitive to wavelength, polarization, angle of incidence, etc. In all examples, the external stimulus is sensed locally (i.e. within the pixel) and the sensor output is used to control the display element in the pixel. In many of these examples the external stimulus is an analog signal. It will be appreciated that some of these external stimuli are not visible (e.g. infra-red) and so enable covert printing or rendering (i.e. other viewers cannot see the image before it is rendered on the display).

In some of the examples one or both of the external stimuli are analog signals, i.e. in such examples, the first and/or second external stimulus is not a digital signal which encodes data (e.g. a WiFi™ or IrDA signal) and hence the control element 110, in these examples, does not generate the control signal based on decoded data from the sensed external stimulus but instead generates the control signal based, at least in part, on the magnitude (or level) of the sensed external stimulus. In other examples, however, one or both of the external stimuli may be digital signals.

In various examples, the first sensor 106 detects a first external stimulus and the second sensor 108 detects a second external stimulus which is not the same as the first external stimulus. In some examples, the first and second external stimuli may both be electromagnetic radiation but may be different wavelengths or different wavelength ranges (e.g. the first external stimulus may be visible light and the second external stimulus may be infra-red or the first external stimulus may be blue light and the second external stimulus may be red light). In other examples, the first and second external stimuli may be of a different type, (e.g. the first external stimulus may be a part of the electromagnetic spectrum and the second external stimulus may be pressure or capacitance).

In examples where the sensors 106, 108 detect different external stimuli, the different sensor signals may be used to provide different modes of operation for the pixel 102 (and hence for a display comprising a plurality of the pixels 102), e.g. a first mode of operation in which the visual appearance of the pixel depends upon the sensed magnitude of the first external stimulus and a second mode of operation in which the visual appearance of the pixel depends upon the sensed magnitude of the second external stimulus (as described in more detail below with reference to FIGS. 2-5). In such examples, both external stimuli may be described as providing "image data".

In other examples where the sensors 106, 108 detect different external stimuli, the different sensor signals may be used collectively to determine the visual appearance of the pixel and in these examples the control signal generated by a control element 110 is based on both a level of the first external stimulus detected by the first sensor 106 and a level of the second external stimulus detected by the second sensor 108, e.g. such that the visual appearance of the pixel depends upon the sensed magnitudes of both external stimuli. In various examples, both of the external stimuli may be considered to provide a part of the "image data", e.g. where the sensed magnitude of the first external stimulus compared to a first threshold determines whether a pixel is black and the sensed magnitude of the second external stimulus compared to a second threshold determines whether a pixel is white or where the visual state of the pixel depends upon whether both of the sensed magnitudes exceed a threshold, where the thresholds for the two external stimuli may be the same or different and may be pre-defined and stored within the autonomous pixel (as described in more detail below with reference to FIG. 4-7). In other examples, the first external stimulus may be considered to provide the "image data" (e.g. where the control signal generated by a control element 110 is based on a level of the first external stimulus) and the second external stimulus may be considered to provide "control data", e.g. where the level of the second external stimulus may be used to determine the timing of any change in the state of the display element, to selectively enable pixels (e.g. such that their visual state can be changed) and/or to specify one or more control parameters, such as a threshold level, update time, or sensitivity that is then used in generating the control signal (as described in more detail below with reference to FIGS. 8-12).

In other examples, both the first sensor 106 and the second sensor 108 detect the same external stimulus but the two sensors have different sensing properties, e.g. they may be of a different physical size so that the magnitude of the signal generated by the two sensors is different for the same level of external stimulus and/or they may be of a different shape and/or orientation and/or they may detect a different polarization or a different magnitude of the incident light from a particular (pre-defined) direction. By selectively connecting to one or both of the sensors within the control element 110 (as described in more detail below with reference to FIGS. 13 and 14), the gain of the control signal (and hence the sensitivity of the pixel to the external stimulus) may be varied and this may enable operation across many different environmental conditions (e.g. because the pixel may act over a large bandwidth of signal energies which often scale exponentially).

As shown in FIG. 1, in various examples the control element 110 may functionally be considered as a combination of two or more different functional elements, e.g. a pixel driver 112 and a pixel controller 114. Whilst these elements may be functionally distinct from the sensors 106, 108, in various examples a single electronic component (e.g. a single transistor) or a group of components may be used to carry out more than one of the functions of the pixel driver 112 and the pixel controller 114 and optionally one of the sensors 106, 108.

The pixel controller 114 takes input from one or both of the sensors 106, 108 and outputs a local control signal in order to affect the display element 104 in the pixel 102. In various examples, the pixel controller 114 may perform some simple processing of the input signal, such as thresholding, tone mapping, delay effects, signal processing, blending, etc.

Where thresholding is used this may, for example, involve setting a baseline signal level (e.g. based on ambient conditions such as ambient light) so that only the amount of increased signal above the baseline level (e.g. the amount of increased light incident on any given pixel) is used to drive the value of that pixel. Alternatively, a threshold may be used to provide a binary output to the associated pixel, e.g. if the input signal exceeds the threshold level, a 'high' local control signal may be generated (e.g. an 'on' signal) and if the input signal does not exceed the threshold level, a 'low' local control signal may be generated (e.g. an 'off' signal). Tone mapping is a type of thresholding in which the input signal (e.g. the incident light level) is mapped to output colors to display. Where a threshold is used, the threshold may be fixed or variable. Where the threshold is variable, the threshold value may be set based on an input from one or both of the sensors 106, 108 (as described in more detail below with reference to FIGS. 10 and 11) and in such examples the threshold may be set in real time (e.g. in parallel with the application of the threshold).

Use of delay effects refers to the introduction of a delay between the detection of the external stimulus and the driving of the display and this may, for example, introduce a fixed or variable time delay. Signal processing may be used such that the output is not just a function of the current input but a function such as smoothing (e.g. over time) is implemented. Where blending is used the refers to the control signal taking into account previous sensed data as stored in a buffer or the sensed data from adjacent or nearby pixels.

The pixel driver 112 (which in various examples may be integrated with the pixel controller 114) amplifies the output of the pixel controller 114 and will depend upon the type of technology used for the display element 104. Where the display element 104 is multi-stable, the pixel driver 114 and other elements within the pixel 102 can be powered down once the display element 104 has been updated.

Figure 2:
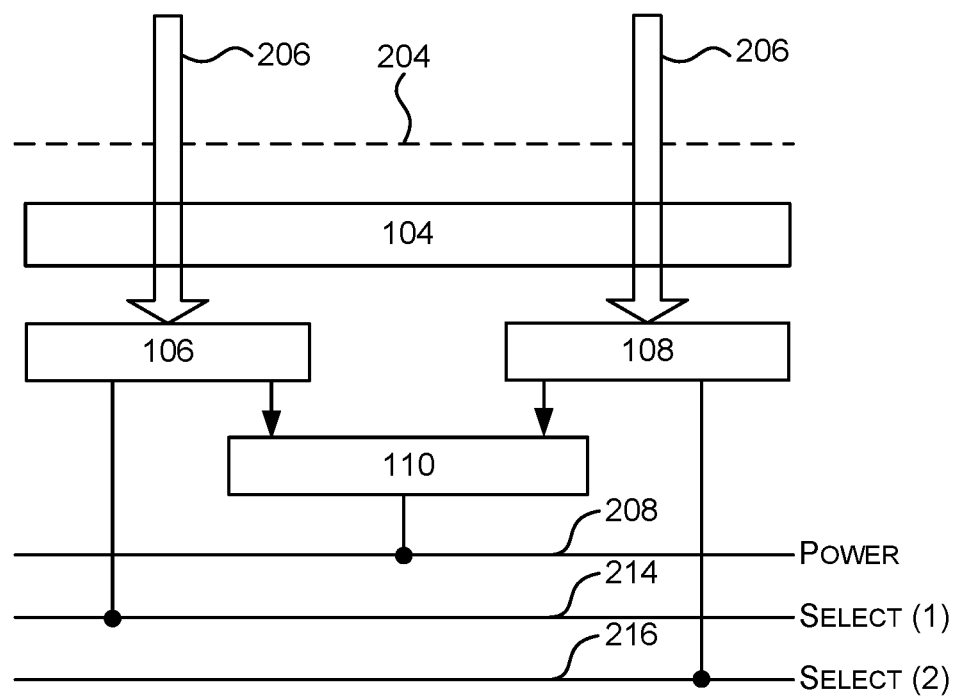
FIG. 2 is a schematic diagram of an example autonomous pixel.

FIG. 2 shows a schematic diagram of an autonomous pixel 102 comprising a display element 104, two sensors 106, 108 and a control element 110. The two sensors 106, 108 detect different external stimuli and the autonomous pixel 102 has two different operating modes: a first mode of operation in which the visual appearance of the pixel depends upon the sensed magnitude of the first external stimulus (as detected by the first sensor 106) and a second mode of operation in which the visual appearance of the pixel depends upon the sensed magnitude of the second external stimulus (as detected by the second sensor 108). The autonomous pixel further comprises a plurality of global electrical connections 208, 214, 216 (which may be electrical planes) to which all the autonomous pixels 102 in a display are connected and in the arrangement shown, each pixel connects to each rail or plane from above (e.g. using electrical vias). The global electrical connections comprise a global power rail or plane 208 and two global select planes 214, 216. The first global select plane 214 is connected to the first sensor 106 in each of the autonomous pixels and the second global select plane 216 is connected to the second sensor 108 in each of the autonomous pixels. The mode of operation of the autonomous pixel (and all autonomous pixels in the display) is selected by connecting one of the two select planes 214, 216 to a global contact (e.g. to connect the particular select plane to ground). This selection may be made by a user, e.g. by pressing a switch which changes which of the two select planes 214, 216 are connected to the global contact and this selects the mode of operation of the autonomous pixel shown in FIG. 2 and the mode of operation of all other autonomous pixels in the display (as they are connected to the same global contacts).

Figure 3:
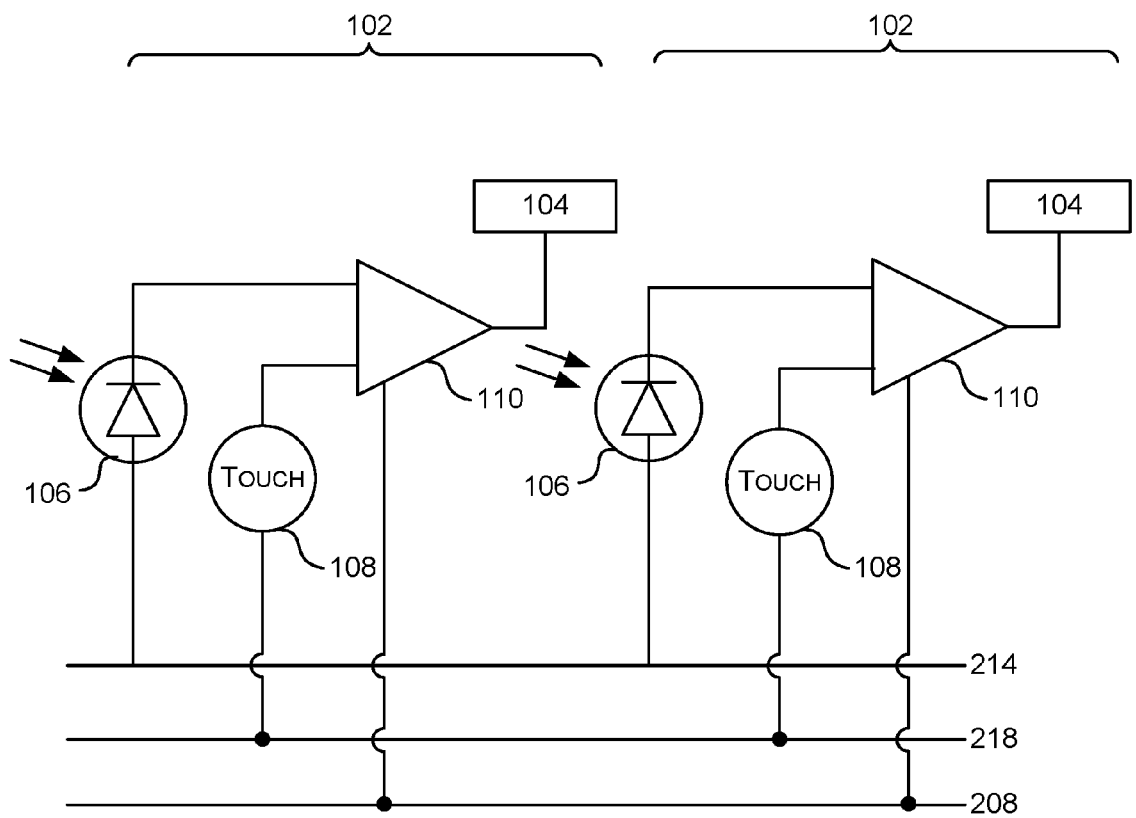
FIG. 3 is a circuit diagram of an autonomous pixel such as the one shown in FIG. 2.

A circuit diagram showing two autonomous pixels which correspond to the schematic diagram shown in FIG. 2 is shown in FIG. 3 and in this example, the first sensor 106 is responsive to light (e.g. visible light or infra-red) and the second sensor 108 is responsive to touch. Consequently, when in the first mode of operation, a display comprising the autonomous pixels is responsive to light (i.e. any changes to the visual information displayed will be dependent upon the light incident on each individual pixel) and when in the second mode of operation, a display comprising the autonomous pixels is responsive to touch (i.e. any changes to the visual information displayed will be dependent upon which pixels have detected local touch events).

In the examples shown in FIGS. 2 and 3, if the first select plane 214 is connected to the global contact, the control element 110 receives an input signal from the first sensor 106 and no input signal is received from the second sensor 108 and if the second select plane 216 is connected to the global contact, the control element 110 receives an input signal from the second sensor 108 and no input signal is received from the first sensor 106. The control element 110 generates a control signal based, at least in part, on the received input signal and as the received input signal generated by the first or second sensor is dependent upon the magnitude of the detected external stimulus, the control signal which is generated is also based, at least in part, on the level of either the first external stimulus (if the first select plane 214 is connected to the global contact) or the second external stimulus (if the second select plane 216 is connected to the global contact). The control signal which is generated is output to the display element 104 and dependent upon the current state of the display element 104 and the level of the control signal, this may result in a change in the state of the display element 104 and hence a change in the visual appearance of the autonomous pixel.

In the example shown in FIG. 3, the first sensor 106 is sensitive to light (e.g. visible light or infra-red) and the second sensor 108 is sensitive to touch. This combination of external stimuli provides a display which is responsive to touch but can be written to using a projector or other light source, e.g. such that an image can be rendered on the display using a light source when in the first mode of operation and then annotated by a user touching the display when in the second mode of operation. In other examples, however, the first and second sensors 106, 108 may be sensitive to different wavelengths in the electromagnetic spectrum (e.g. different wavelengths of visible light, to visible light and infra-red) or any other combination of external stimuli (e.g. ultrasound and infra-red, pressure and light, etc.). Where different wavelengths of visible light are used, this enables both external stimuli to be provided by a single source (e.g. a projector, which may be integrated within a user device). Where infra-red, visible light and/or infra-red is used beamforming can be implemented easily at the source (e.g. compared to RF, which involves additional complexity at the source to implement beamforming). In various examples, "image data" may be provided using an external stimulus that can be provided at higher resolution (i.e. in a more localized manner) on a display and "control data" may be provided using an external stimulus where such higher resolution is not possible or not needed (e.g. where the "control data" provides a global expose or other global parameter).

Figure 4:
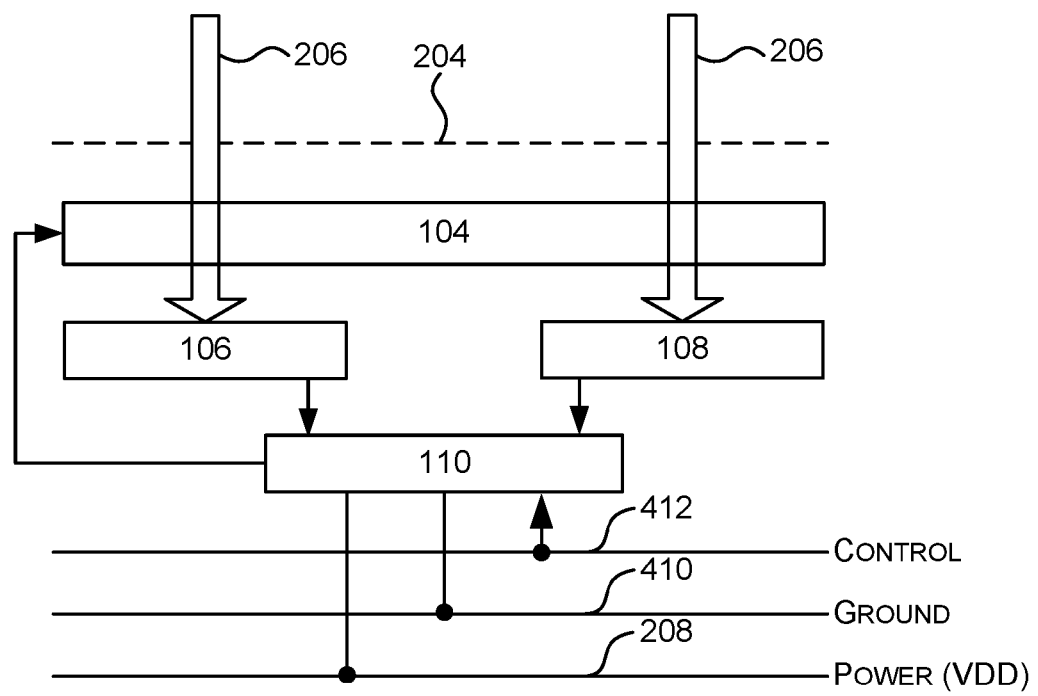
FIG. 4 is a schematic diagram of another example autonomous pixel.

FIG. 4 shows another schematic diagram of an autonomous pixel 102 comprising a display element 104, a control element 110 and two sensors 106, 108 which detect different external stimuli. The autonomous pixel further comprises a plurality of global electrical connections 208, 410, 412 (which may be electrical planes) to which all the autonomous pixels 102 in a display are connected and in the arrangement shown, each pixel connects to each rail or plane from above (e.g. using electrical vias). The global electrical connections comprise a global power rail or plane 208, a global ground rail or plane 410 and a global control rail or plane 412. The global control rail or plane 412 is connected to the control element 110 and is may be used in various different ways, as described below. Various methods of operation of the autonomous pixel shown in FIG. 4, and more specifically the control element 110 within the autonomous pixel, can be described with reference to the flow diagram in FIG. 5.

Figure 5:
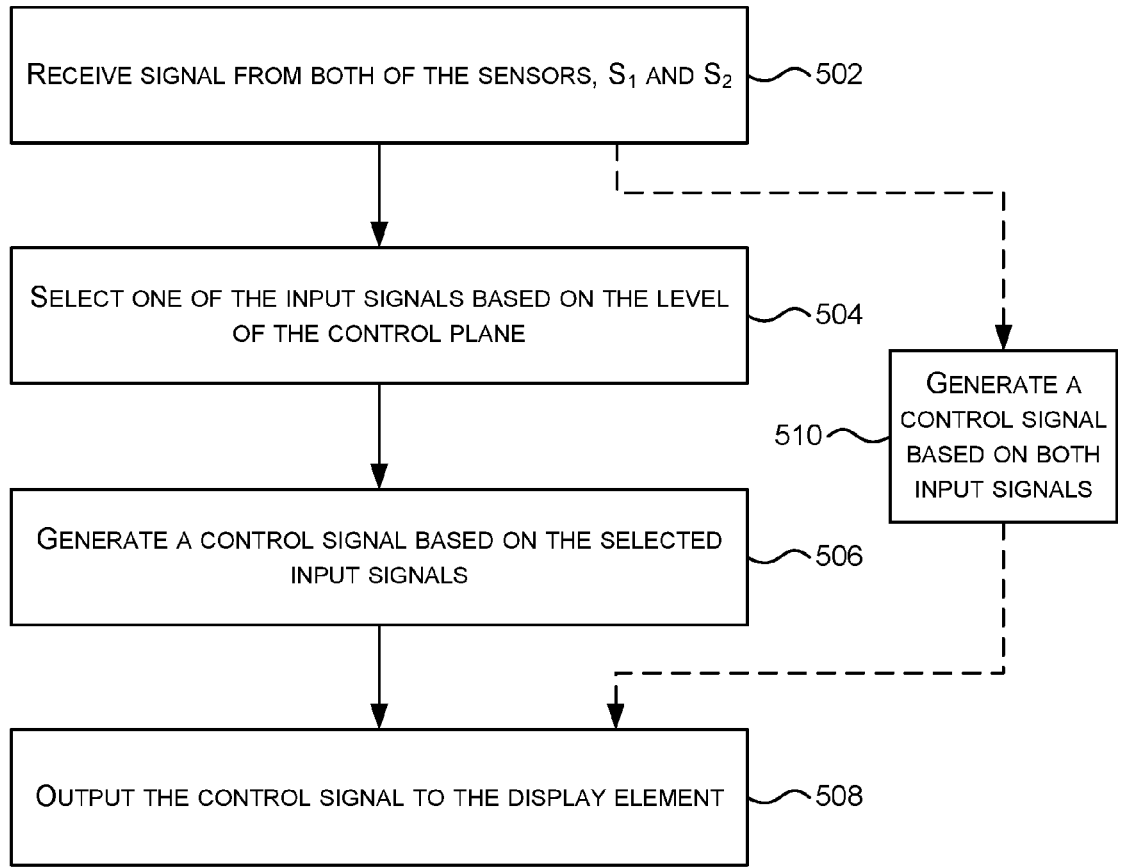
FIG. 5 is a flow diagram showing example methods of operation of an autonomous pixel such as the one shown in FIG. 4.

According to a first method of operation shown in FIG. 5, the autonomous pixel 102 has two different operating modes: a first mode of operation in which the visual appearance of the pixel depends upon the sensed magnitude of the first external stimulus (as detected by the first sensor 106) and a second mode of operation in which the visual appearance of the pixel depends upon the sensed magnitude of the second external stimulus (as detected by the second sensor 108). The operating mode is selected using the control plane 412 and as all pixels in a display are connected to the same control plane 412, the mode of operation of all the pixels can be set together.

In response to a first external stimuli, the first sensor 106 generates a first sensor output signal, $S_1$, and in response to a second external stimuli, the second sensor 106 generates a second sensor output signal, $S_2$, where the first and second external stimuli are different. In various examples the first and second sensors 106, 108 may be sensitive to different wavelengths in the electromagnetic spectrum (e.g. different wavelengths of visible light, to visible light and infra-red) or any other combination of external stimuli (e.g. ultrasound and infra-red, pressure and light, etc.). At any time, none, one or both of the external stimuli may be present and so whilst the control element 110 receives signals from both sensors 106, 108 (block 502), the magnitudes of those signals will vary over time and neither, one or both of those magnitudes may be zero.

The control element 110 selects one of the input signals (i.e. either the signal from the first sensor 106 or the signal from the second sensor 108) based on a signal received from the control plane 412 (block 504), e.g. based on a voltage level of the control plane 412 and/or on whether the control plane 412 is high or low impedance, and generates a control signal based, at least in part, on the selected input signal (block 506). As the input signals that are generated by the sensors are dependent upon the magnitude of the detected external stimulus, the control signal which is generated (in block 506) is also based, at least in part, on the level of either the first external stimulus (as detected by the first sensor 106) or the second external stimulus (as detected by the second sensor 108). The control signal which is generated (in block 506) is output to the display element 104 (block 508) and dependent upon the current state of the display element 104 and the level of the control signal, this may result in a change in the state of the display element 104 and hence a change in the visual appearance of the autonomous pixel.

Like in the example described above with reference to FIGS. 2 and 3, the first sensor 106 in the autonomous pixel shown in FIG. 4 may be sensitive to light (e.g. visible light or infra-red) and the second sensor 108 in the autonomous pixel shown in FIG. 4 may be sensitive to touch. This combination of external stimuli provides a display which is responsive to touch but can be written to using a projector or other light source, e.g. such that an image can be rendered on the display using a light source when in the first mode of operation and then annotated by a user touching the display (e.g. with their finger) when in the second mode of operation. In other examples, the "touch" input may be provided using a light pen held by the user and in such examples the "touch" sensor may not be sensitive to pressure but sensitive to the wavelength of light (e.g. visible or infra-red) emitted by the light pen. In other examples, however, the first and second sensors 106, 108 may be sensitive to different wavelengths in the electromagnetic spectrum (e.g. different wavelengths of visible light, to visible light and infra-red) or any other combination of external stimuli (e.g. ultrasound and infra-red, pressure and light, etc.).

Although this first method of operation of the autonomous pixel shown in FIG. 4 is described with reference to two different modes of operation, in other examples the pixel may have more than two modes of operation (e.g. in which it is sensitive to touch, light or touch and light or there may be additional sensors which are sensitive to other external stimuli). For example, one of three different modes of operation may be selected by the control element 110 based on both the voltage level of the control plane 412 and whether the control plane 412 is high or low impedance.

According to a second, alternative, method of operation of the autonomous pixel shown in FIG. 4 which is shown in FIG. 5 (as indicated by the dotted arrows), the autonomous pixel does not have two different operating modes (unlike the first method) but instead uses both the first sensor output signal (generated in response to the first external stimulus) and the second sensor output signal (generated in response to the second external stimulus where, as before, the first and second external stimuli are different) to generate the control signal (block 510). Consequently, whilst the autonomous pixel is the same at the level of detail shown in FIG. 4 irrespective of whether it implements the first or second method of operation, at a more detailed level, the autonomous pixel will not be the same. In particular, the control element 110 may be different depending upon whether it implements the first or second of the methods described with reference to FIG. 5 (e.g. it may comprise a different arrangement of electronic components, such as switches, amplifiers for gain or attenuation, logic gates to select behaviors, comparators, other signal processing components to add or subtract signals, etc.).

In the second method of operation shown in FIG. 5, the control plane 412 is not used to select an input signal (as it is in the first method) but instead it may provide a global expose signal (e.g. such that the control signals are generated by all of the autonomous pixels in a display at the same time and/or the state of the display elements in all of the autonomous pixels in a display are updated at the same time) or it may be omitted.

As described above, at any time, none, one or both of the external stimuli may be present and so whilst the control element 110 receives signals from both sensors 106, 108 (in block 502), the magnitudes of those signals will vary and neither, one or both of those magnitudes may be zero.

The two sensors 106, 108 in an autonomous pixel as shown in FIG. 4 which implements the second method of operation (described with reference to FIG. 5) may be arranged to detect different wavelengths (or wavelength ranges) of electromagnetic radiation and the visual appearance of the pixel depends on both external stimuli. In a first example which can be described with reference to FIG. 6, the first sensor 106 in each pixel 602a-c detects a first wavelength (or range of wavelengths) of light (e.g. red light) and the second sensor 108 detects a second wavelength (or range of wavelengths) of light (e.g. blue light). The control element 110 is configured (in block 510) to generate a control signal to drive a display element to a particular state (e.g. to black) if the level of the first external stimulus exceeds a first threshold and to generate a control signal to drive a display element to a different state (e.g. to white) if the level of the second external stimulus exceeds a second threshold, where the first and second thresholds may be the same or may be different. If neither of the levels exceeds its respective threshold, no control signal is generated (or a control signal is generated that does not change the state of the display element. The thresholds may be pre-defined and stored within the pixel.

Figure 6:
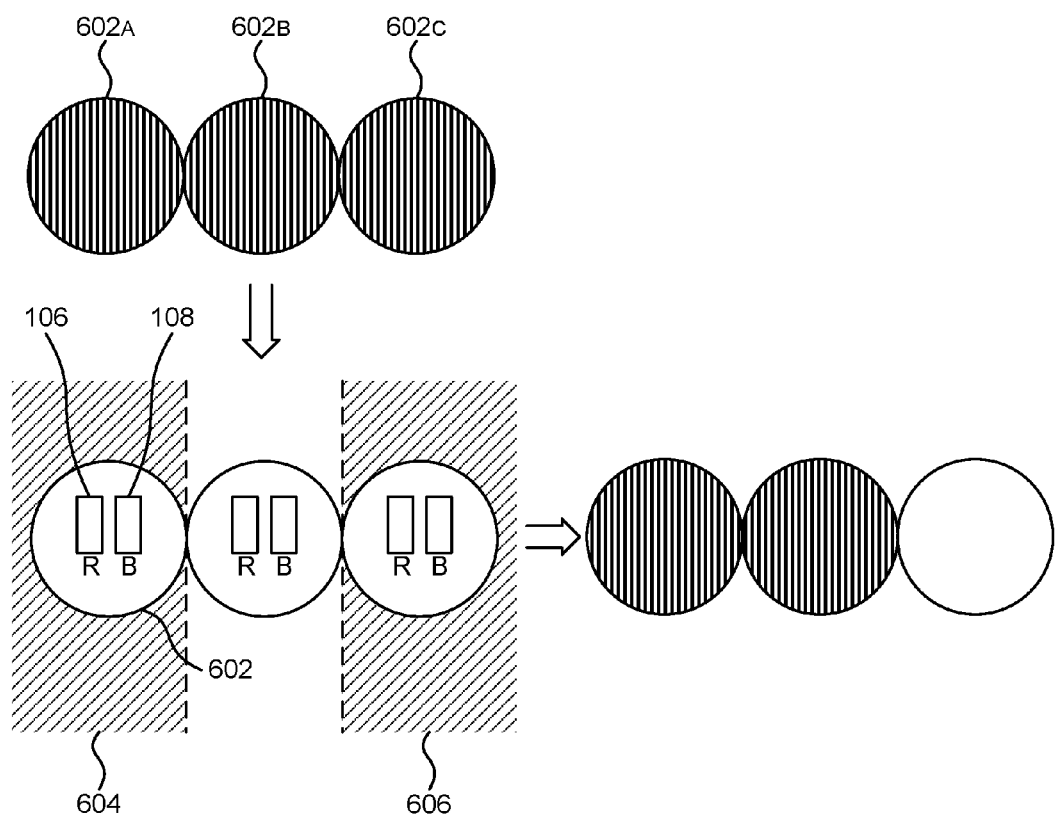
FIG. 6 is a schematic diagram illustrating another example method of operation of an autonomous pixel such as the one shown in FIG. 4.

Referring to the example shown in FIG. 6, if initially all display elements are black and then two separate regions 604, 606 are illuminated with the first and second wavelengths respectively, the control signals generated in each of the three pixels 602a-c will be different. In the first pixel 602a, the first sensor 106 detects the first wavelength and the second sensor 108 does not detect the second wavelength and so a control signal is generated (in block 510) to drive the display element to black. However, as the display element is already black, no change in that pixel is visible. In the second pixel 602b, the first sensor 106 does not detect the first wavelength and the second sensor 108 does not detect the second wavelength and so no control signal is generated (in block 510) and there is no change in that pixel. In the third pixel 602c, the first sensor 106 does not detect the first wavelength and the second sensor 108 detects the second wavelength and so a control signal is generated (in block 510) to drive the display element to white.

In this example, as different wavelengths (or wavelength ranges) are used to drive the display elements to black and white, there is no need to have a specific erase cycle as one external stimulus can be used to write (e.g. to change a pixel from black to white) and another external stimulus can be used to erase (e.g. to change a pixel from white to black). This may speed up operation of the display and/or simplify the control of the display. Additionally, the autonomous pixel may operate in a more robust and accurate manner because the state of the display element is not affected by the absence of any signal such as caused by shadows on the display (e.g. in contrast to a pixel which changes to white in response to an external stimulus and to black in the absence of that stimulus). In some examples, the source of the external stimulus may use live feedback to further improve robustness (e.g. the source may monitor whether the pixels change in response to the applied stimulus and if not, may provide further external stimulus to "re-write" the change).

A second example of the second method of operation described with reference to FIG. 5 can be described with reference to FIG. 7 and in this example, each autonomous pixel 702 comprises three different sensors which each detect a different wavelength (or range of wavelengths). Three input signals, $S_1$, $S_2$, $S_3$, are therefore received by the control element 110 (in block 502) and the control signal is generated based on all of the input signals (in block 510). In this example, a control signal is only generated (in block 510) if each of the sensors detects a level of external stimulus that exceeds a corresponding threshold (where there may be one threshold per external stimulus or a common threshold for all external stimuli). In the example shown in FIG. 7 there is an array of autonomous pixels 702 and the size of a pixel is smaller than each of the incident beams of light 704, where each beam corresponds to one of the wavelengths detected by the three sensors in each pixel. By only generating a control signal if all three sensors detect their respective external stimulus, the resolution which can be achieved when addressing pixels is finer than the area of the display which is covered by any one of the incident beams (i.e. depending upon how the three beams are aligned, the portion where they cross may be significantly smaller than any of the individual beams and only those pixels within the overlapping region will be updated based on the external stimuli). In some examples, the source of the external stimulus may use live feedback to control or check alignment between the beams and the pixels (e.g. the source may monitor which the pixels change in response to the applied stimulus and if the wrong pixels change, may provide further external stimulus to correct the error).

Figure 7:
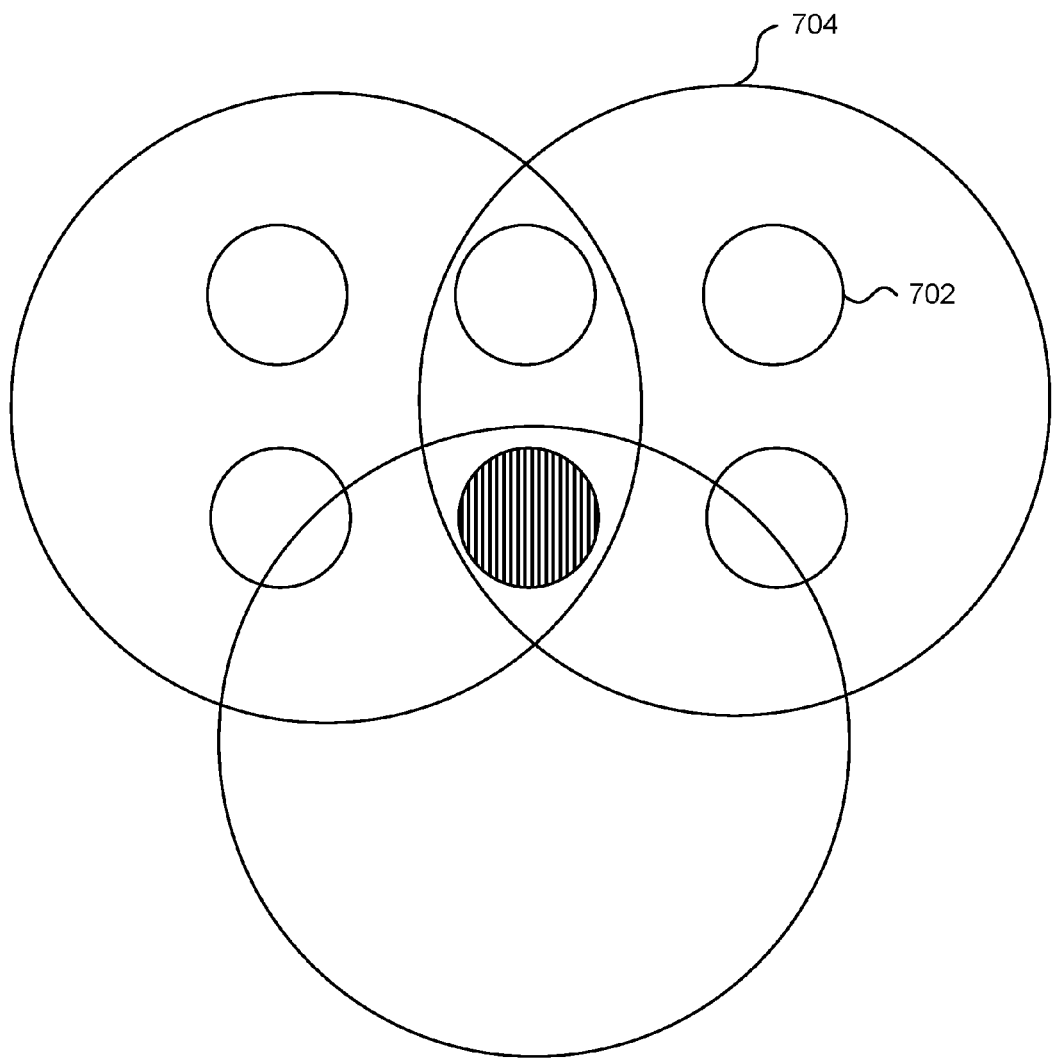
FIG. 7 is a schematic diagram illustrating a further example method of operation of an autonomous pixel such as the one shown in FIG. 4.

Although the examples in FIGS. 6 and 7 are described with reference to using light as the external stimulus, it will be appreciated that this is by way of example and in other examples, different external stimuli may be used.

Figure 8:
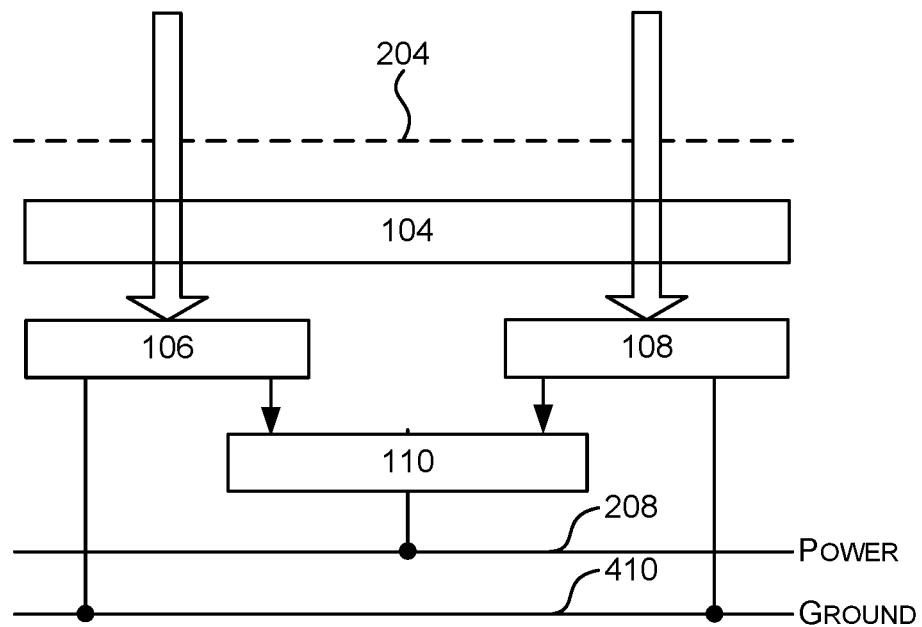
FIG. 8 is a schematic diagram of a further example autonomous pixel.

FIG. 8 shows a schematic diagram of another autonomous pixel 102 comprising a display element 104, two sensors 106, 108 and a control element 110. The autonomous pixel also comprises two global electrical connections: a global power plane 208 (connected to the control element 110) and a global ground plane 410 (connected to both of the sensors 104, 106). The two sensors 106, 108 are arranged to detect different external stimuli and the control element 110 is arranged to generate a control signal to drive the display element 104 based on input signals received from both of the sensors. The first sensor 106 generates a signal in response to detection of a first external stimulus and the resultant state of the display element 104 is dependent upon the detected level of the first external stimulus. Exactly how the detected level of the first external stimulus is mapped to a state of the display element 104 depends upon a detected level of the second external stimulus by the second sensor 108 and various examples are described below. Consequently, by varying the level of the second external stimulus which is applied to a pixel (or to a plurality of pixels which may form an entire display or part of a display), the operation of the pixel can be varied even if the detected level of the first external stimulus remains constant.

In the autonomous pixel 102 shown in FIG. 8, the signal, $S_1$, generated by the first sensor may be described as providing "image data" and the signal, $S_2$, generated by the second sensor may be described as providing "control data", where this control data may, for example, specify when a pixel is updated (e.g. in the form of an expose signal received via an external stimulus rather than a global control plane), provide data which is used to reject background (or ambient) levels of an external stimulus, provide data to set the sensitivity of the pixel (e.g. by setting a threshold), provide data to switch between writing and erasing modes, provide data to selectively enable writing to the pixel, etc. This "control data" may, for example, replace data that is provided in some of the earlier examples via a global control plane 412. In many of the examples described below, the second input signal (generated by the second sensor 108 in response to detecting the second external stimulus) is used, by the control element 110, to generate one or more control parameters (e.g. one or more thresholds) and the control parameter(s) are then used when generating the control signal based on the level of the first external stimulus as detected by the first sensor 106.

Although FIG. 8 does not show a global control plane (e.g. because control data is instead provided using an external stimulus), in various examples there may be a global control plane which provides additional control data (e.g. in the form of a voltage level) to all of the pixels in a display (e.g. similar to the control plane 412 shown in FIG. 4). This additional control data may be used in combination with the control data (e.g. the one or more control parameters) provided by the detected level of the second external stimulus.

Figure 9:
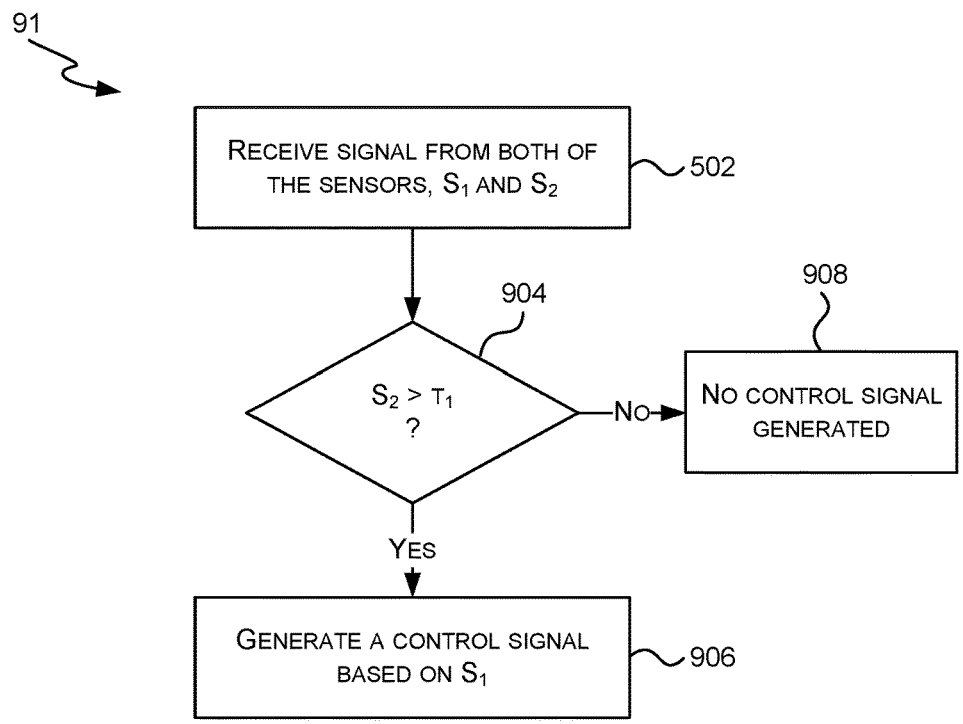
FIG. 9 shows a flow diagram showing an example method of operation of an autonomous pixel such as the one shown in FIG. 8 and a circuit diagram of an autonomous pixel such as the one shown in FIG. 8.
Figure 9:
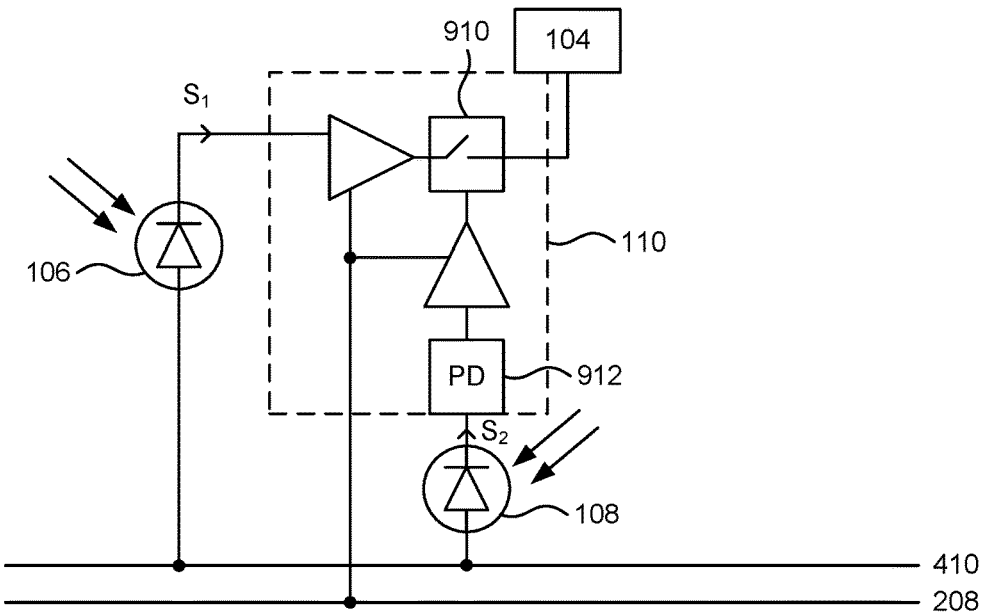

In a first example method of operation of the control element 110 in FIG. 8, as shown in the flow diagram 91 in FIG. 9, the second sensor 108 generates a signal in response to detection of a second external stimulus and based on this signal, $S_2$, which is input to the control element 110, the pixel is selectively enabled, i.e. if the detected level of the second external stimulus does not exceed a threshold value, $T_1$, ('No' in block 904) then the control element 110 does not generate a control signal (block 908) irrespective of the detected level of the first external stimulus and the display element 104 is not updated. Only if the detected level of the second external stimulus is above the threshold value, $T_1$, ('Yes' in block 904) is a control signal generated based on the detected level of the first external stimulus (block 906). The decision which is made when comparing the second input signal, $S_2$, to the threshold value, $T_1$ (in block 904) may be considered to generate a binary output (1 or 0) which determines whether a control signal is generated and this binary output (e.g. 1=Yes, 0=No) is an example of a control parameter which may be generated by the control element 110 based on the second input signal, $S_2$.

FIG. 9 also shows an example implementation of the control element 110. In the example shown, a switch 910 is controlled based on the signal, $S_2$, output from the second sensor 108 and only if this switch is closed does the display element 104 receive a control signal which is based on the signal, $S_1$, output from the first sensor 106. The switch 910 will only close if the second input signal, $S_2$, is above the threshold value, $T_1$. The implementation shown includes an optional peak detection module 912 which may be used if the incident strength of the second external stimulus varies over time or if there is a delay between detection of the second external stimulus and detection of the first external stimulus. Although not shown in FIG. 9, the control element 110 may include a band pass filter after the first sensor 106 and/or second sensor 108. This may be used to filter out any component of the first and/or second external stimulus that is generated by the environment (e.g. by the sun) and isolate an applied first and/or second external stimulus which may, for example, be modulated with a frequency that does not naturally occur, or does not naturally occur in substantially quantities, within the environment.

This method (as shown in flow diagram 91) enables pixels in a display to be selectively switched into a mode in which they can be changed (e.g. a write mode) by application of the second external stimulus. In the absence of the second external stimulus, an autonomous pixel maintains its state (i.e. its visual appearance) and so may be considered to be in a read-only mode (where the reading is performed by a user viewing the autonomous pixel). When operating in this way, the second external stimulus provides a means of addressing autonomous pixels in a display (i.e. selectively activating the pixels). In addition, or instead, this method may be used to provide an expose signal for the pixels (using the second external stimulus) because display elements within a pixel can only be updated when the detected level of the second external stimulus exceeds the threshold, $T_1$ (i.e. such that when the second external stimulus is applied at a level that exceeds the threshold, all the pixels are updated and by repeatedly switching the second stimulus on and off, the pixels receiving the second external stimulus may be updated repeatedly and in a time-synchronized manner). The expose signal may be provided globally (i.e. by applying the second external stimulus to all of the autonomous pixels in a display) or to only a part of the display (e.g. to selectively read part of the display, which may, for example, provide a fast way of scanning a large area display for touch events).

Figure 10:
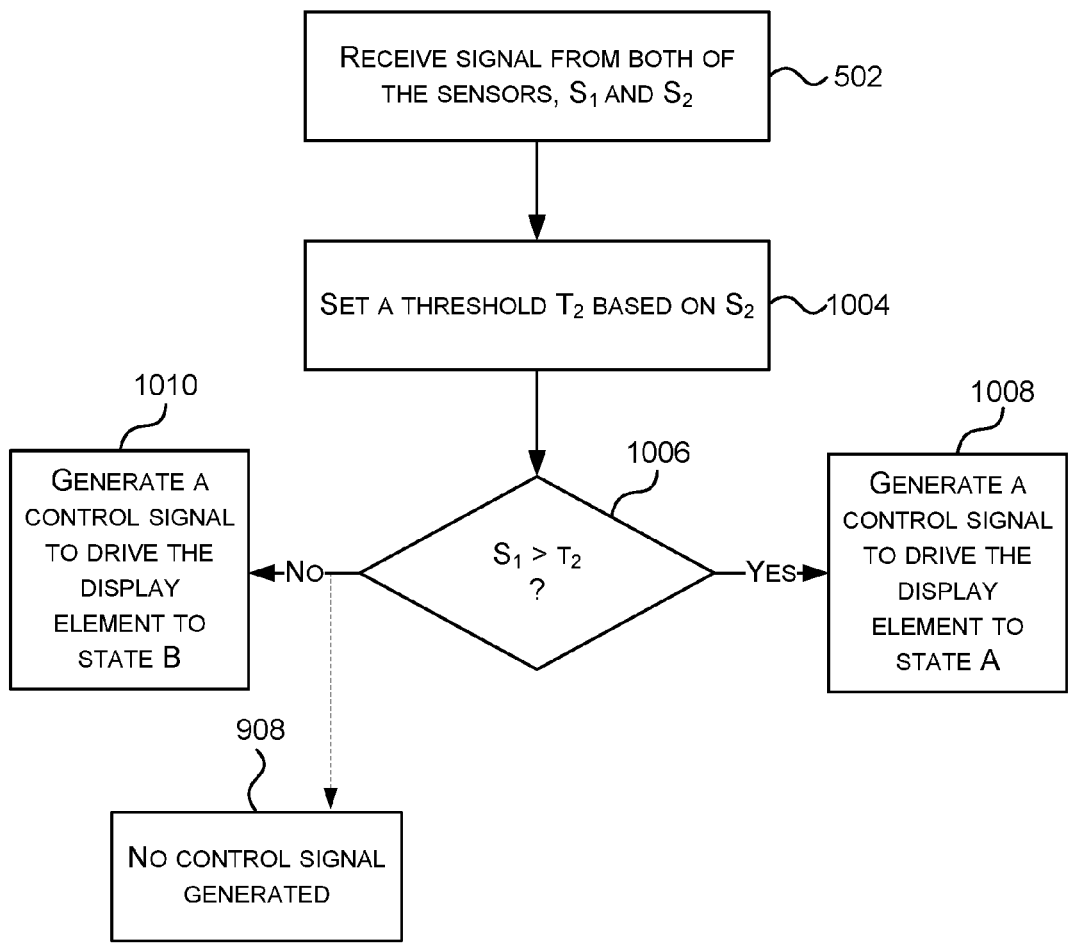
FIG. 10 is a flow diagram showing other example methods of operation of an autonomous pixel such as the one shown in FIG. 8.

In a second example method of operation of the control element 110 in FIG. 8, as shown in the flow diagram in FIG. 10, the second sensor 108 generates a signal, $S_2$, in response to detection of a second external stimulus and this signal, which is input to the control element 110, defines a threshold, $T_2$ (block 1004) which is used within the control element 110 to determine the state that the display element 104 should be driven to and hence to determine the control signal which is generated, e.g. if the signal, $S_1$, input to the control element 110 from the first sensor 106 has a level (or magnitude) which exceeds $T_2$ ('Yes' in block 1006) then a control signal is generated to drive the display element 104 to a first state (block 1008) and if the signal input to the control element 110 from the first sensor 106 has a level (or magnitude) which does not exceed $T_2$ ('No' in block 1006), then a control signal is generated to drive the display element 104 to a second state which is not the same as the first state (block 1010). The threshold value, $T_2$ (generated in block 1004) is an example of a control parameter which is generated by the control element 110 based on the second input signal, $S_2$.

This method (as shown in FIG. 10) enables a threshold to be set without requiring use of a global control plane (e.g. global control plane 412) and allows the threshold to be set (and varied) in real time. In addition (or instead) the value may be stored temporarily in a capacitor (i.e. in the form of energy or voltage) or sampled and stored digitally. Where a capacitor is used, leakage of the capacitor will limit how long the value can be stored for and a second capacitor (which is fully charged at the time that the value is stored) may be used to indicate when the stored threshold value is no longer valid (e.g. when the voltage across the second capacitor falls below a pre-defined level). The storing of a value may enable two levels (e.g. a threshold and a gain) to be communicated using one signal, with the two levels being communicated separated in time.

The method (as shown in FIG. 10) also eliminates a need for a separate erase signal (e.g. because one of state A and state B performs the write and the other performs the erase), although in a variation of the method shown in FIG. 10 (as indicated by the dotted arrow), if $S_1$ does not exceed $T_2$ ('No' in block 1006), no control signal may be generated (block 908) and in this case, the method does not perform both the write and erasing operations, but instead performs only write or erase.

In the method shown in FIG. 10, a separate global expose signal may also be provided in order that all the pixels in the display update at the same time and this global expose signal may, for example, be provided via a global control plane 412 or there may be a third sensor in each pixel which is responsive to a third external stimulus which provides a global expose signal. In other examples, however, the update is triggered whenever $S_1$ exceeds $T_2$ ('Yes' in block 1006). A variation on the method of FIG. 10 is shown in FIG. 11 and in this example, the second external stimulus (which provides the control data) is used to perform three functions: to erase the pixel (i.e. to drive the display element 104 to state B), to set a threshold, $T_2$, and to provide the expose or trigger signal.

Figure 11:
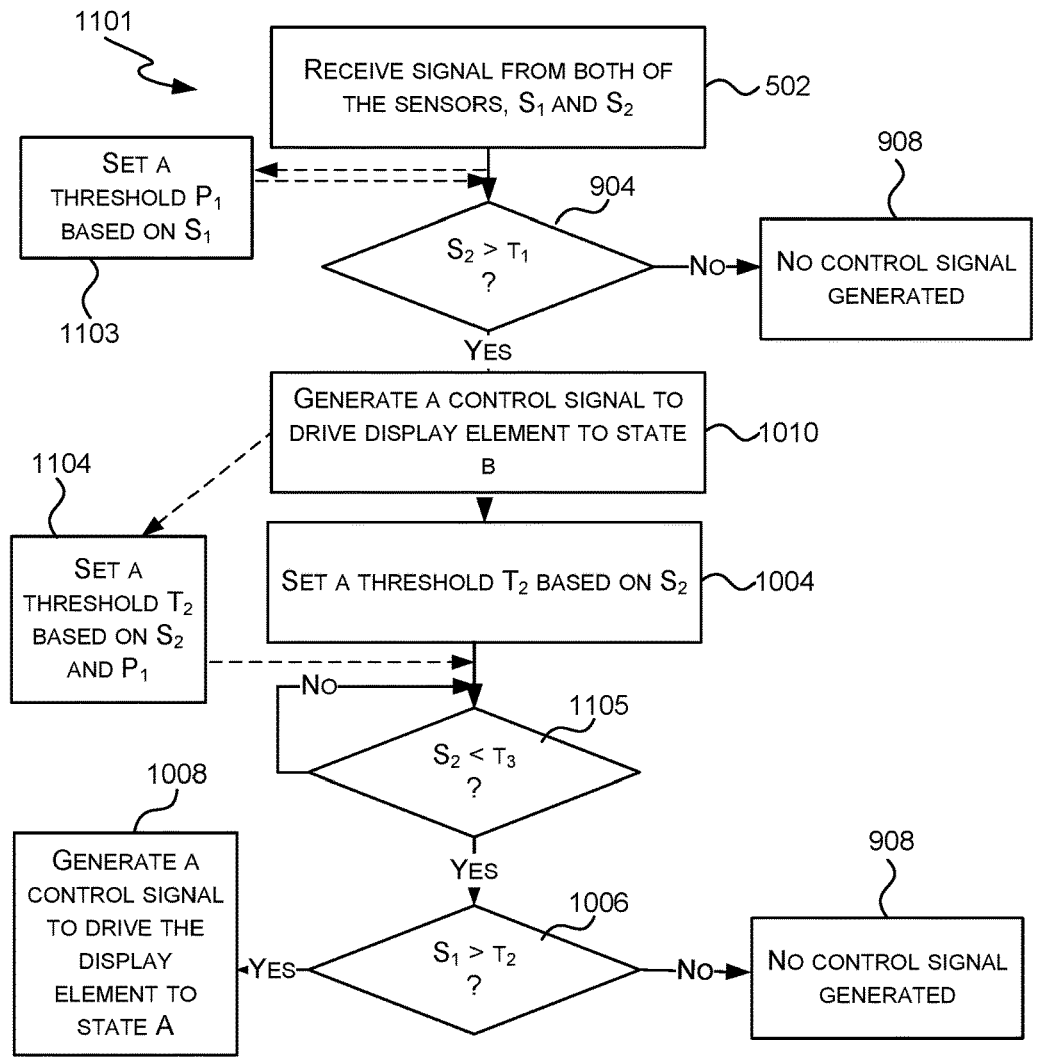
FIG. 11 shows a flow diagram showing further example methods of operation of an autonomous pixel such as the one shown in FIG. 8 and a graph showing the level of the second sensor signal level during the method.
Figure 11:
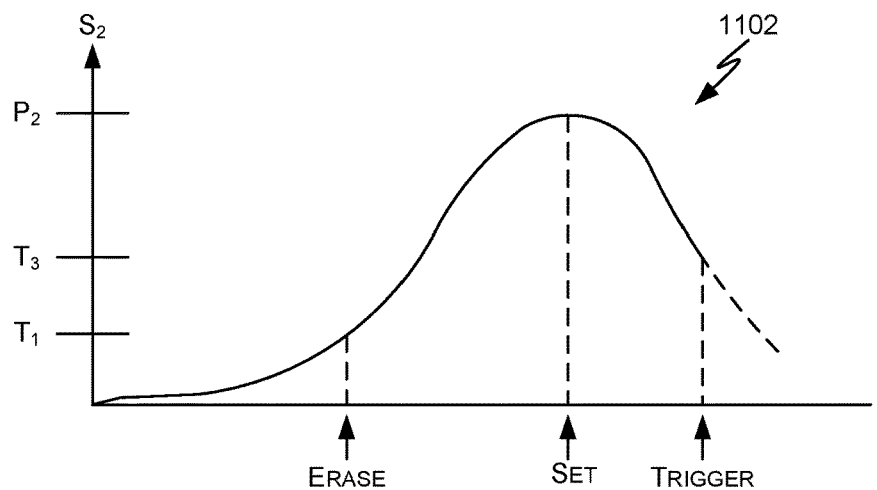

As shown in the flow diagram 1101 and graph 1102 (which shows the magnitude of $S_2$) in FIG. 11, the control element receives signals from both of the sensors (block 502) and when the detected level of the second external stimulus exceeds the threshold value, $T_1$, ('Yes' in block 904), a control signal is generated to drive the display element 104 to its erased or default state, state B (block 1010). A peak value of $S_2$ (labeled $P_2$) is then used to set a threshold, $T_2$ (block 1004). When the value of $S_2$ subsequently falls below a further threshold, $T_3$ ('Yes' in block 1105) the pixel enters a state when it is ready to expose and if the signal, $S_1$, input to the control element 110 from the first sensor 106 has a level (or magnitude) which exceeds $T_2$ ('Yes' in block 1006) a control signal is generated to drive the display element 104 to the written state, state A (block 1008).

In a further variation, instead of the second external stimulus being used to perform three functions (to erase the pixel, to set a threshold and to provide the expose or trigger signal), additional sensing elements may be provided which detect further, different, external stimulus, with different external stimuli and hence different sensor signals being used to provide different types of control data. In an extension of this, different sensors may be used to provide the control data (e.g. background rejection level and gain) for each of the RGB or CMY channels (e.g. such that there are 9 sensors: two for the control data and one for the image data for each of the three channels) or for each channel in the color-space being used.

Using the method shown in FIG. 10 or 11 different thresholds may be set for different autonomous pixels by varying the second external stimulus which is incident upon or applied to different autonomous pixels within a display and this threshold, $T_2$, may be considered to control the sensitivity and/or background rejection of the pixel. The method of FIG. 10 or 11 may, for example, be used where different levels of ambient light rejection are required across a display and in such examples, the varying levels of the second external stimulus across the display may be calculated and applied to the display or where the same interfering source generates both external stimuli, may be provided automatically (e.g. where the first external stimulus is visible light and part of the display is in the sun, the incident infra-red—the second external stimulus—may be used to raise the threshold). In other examples, the second external stimulus may be used to set the maximum intensity of applied external stimulus and the threshold, $T_2$, may be set as a pre-defined fraction of $S_2$ (in block 1004).

The flow diagram 1101 in FIG. 11 also shows a variation on the method described above (as indicated by the dotted arrows) in which the sensitivity and background rejection levels are set independently using the second external stimulus. In this variation, in a period of time before the detected level of the second external stimulus exceeds the threshold value, $T_1$, ('Yes' in block 904), a parameter, $P_1$, is generated based on the signal, $S_1$, received from the first sensor 106 (block 1103). This parameter, $P_1$, is a measure of the background level of the first external stimulus. Subsequently, both $S_2$ and $P_1$ are used to generate the threshold, $T_2$, (block 1104).

Although the methods of FIGS. 10 and 11 have been described above in relation to a display element 104 which has two possible states (e.g. black and white), the methods may also be used where a display element has more than two possible states (e.g. for a greyscale or color display) and in such examples, multiple thresholds may be set based on $S_2$ (or $S_2$ and $P_1$) and then dependent upon the value of $S_1$ compared to each of the thresholds, different control signals may be generated. For example, based on $S_2$ and optionally $P_1$, two thresholds may be set $T_{2-1}$ and $T_{2-2}$ where $T_{2-1} < T_{2-2}$ (in block 1004 or 1104). If $S_1$ does not exceed $T_{2-1}$ then no control signal may be generated (block 908), so that the display element 104 remains in its erased state (e.g. black). If $S_1$ exceeds $T_{2-2}$ then a control signal may be generated (block 1008), so that the display element 104 changes to a one state (e.g. white). If $T_{2-1} < S_1 < T_{2-2}$ then a control signal may be generated (block 1008), so that the display element 104 changes to a different, intermediate, state (e.g. grey). If the display element 104 has more possible intermediate states (e.g. multiple grey levels) then more than two thresholds may be generated (in block 1004 or 1104). In examples with more than two states (e.g. examples with one or more intermediate states such that more than one threshold is set), the benefits associated separate determination of the sensitivity and background rejection level may be increased.

Figure 12:
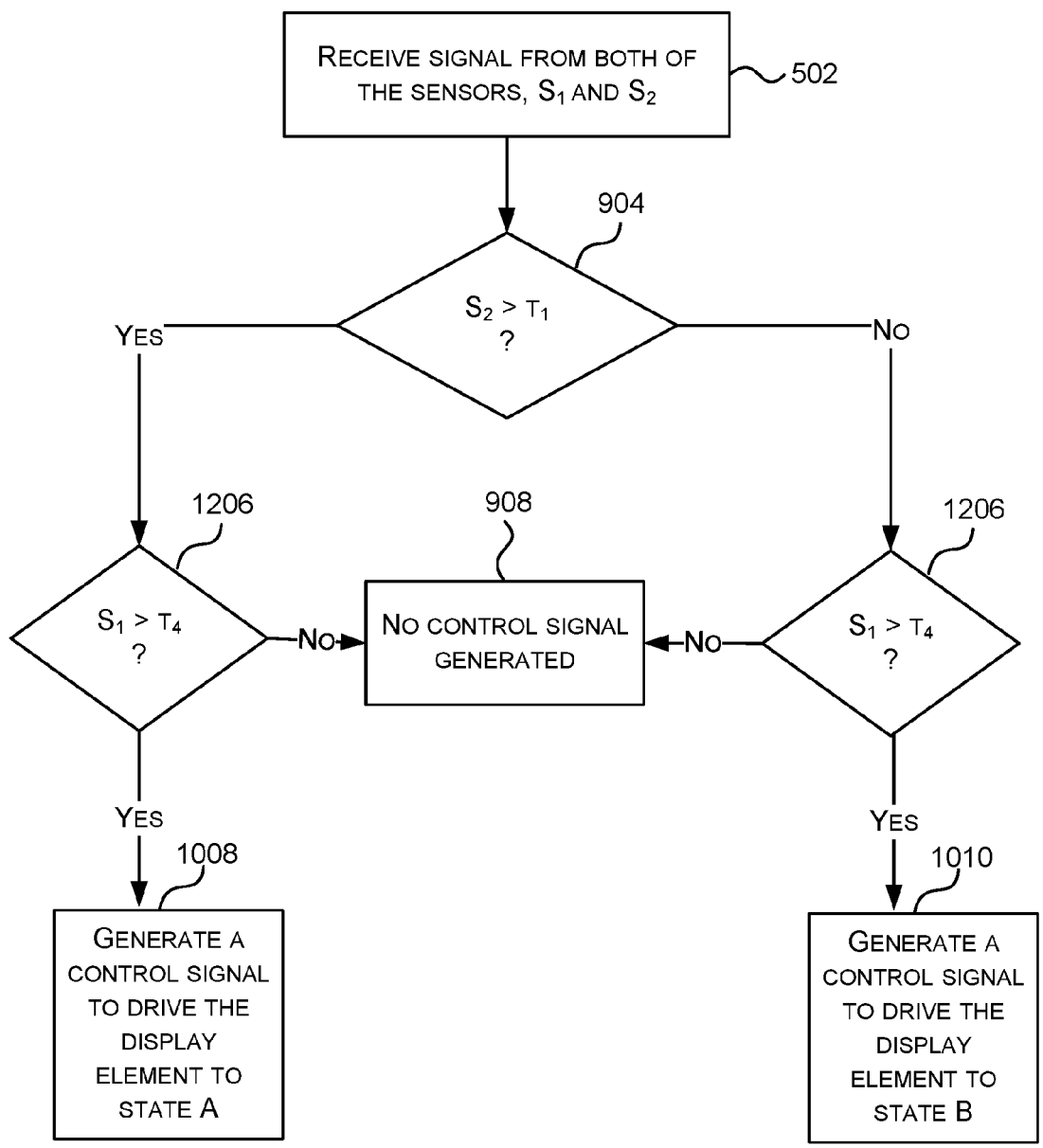
FIG. 12 is a flow diagram showing another example method of operation of an autonomous pixel such as the one shown in FIG. 8.

In a further example method of operation of the control element 110 in FIG. 8, as shown in the flow diagram in FIG. 12, the second sensor 108 generates a signal in response to detection of a second external stimulus and based on this signal, $S_2$, which is input to the control element 110, the pixel is selectively switched into a write mode or an erase mode, where whether a particular display element's state changes in accordance with the selected mode is based on the signal, $S_1$, generated by the first sensor 106 in response to detection of the first external stimulus. As described above, both sensor signals, $S_1$ and $S_2$, are received by the control element 110 (block 502). If the detected level of the second external stimulus exceeds a threshold value, $T_1$, ('Yes' in block 904), then a control signal to drive the display element 104 into a first state, A, is generated (in block 1008) if the detected level of the first external stimulus exceeds a threshold value, $T_4$ ('Yes' in block 1206). If the detected level of the second external stimulus does not exceed the threshold value, $T_1$, ('No' in block 904), then a control signal to drive the display element 104 into a second state, B, is generated (in block 1010) if the detected level of the first external stimulus exceeds a threshold value, $T_4$ ('Yes' in block 1206). In the event that the detected level of the first external stimulus does not exceed the threshold value, $T_4$ ('No' in block 1206), no control signal is generated (block 908).

If state A is considered to be the "written" state of a pixel (e.g. the display element is white) and state B is considered to be the "erased" state of a pixel (e.g. the display element is black), then if $S_2$ exceeds $T_1$ ('Yes' in block 904) the pixel may be considered to have been placed into write mode and if $S_2$ does not exceed $T_1$ ('No' in block 904) the pixel may be considered to have been placed into erase mode. Using the method shown in FIG. 12, a whole display comprising autonomous pixels or part thereof can be switched between write and erase mode using the second external stimulus.

The decision which is made when comparing the second input signal, $S_2$, to the threshold value, $T_1$ (in block 904) may be considered to generate a binary output (1 or 0) which determines the type of a control signal may be generated based on the sensed level of the first external stimulus (in block 1008 or 1010) and this binary output (e.g. 1=Yes, 0=No) is an example of a control parameter which may be generated by the control element 110 based on the second input signal, $S_2$.

In FIGS. 10-12 as described above, the display element in a pixel is driven to different states (e.g. state A in block 1008 or state B in block 1010) depending upon the value of one or both of the sensor signals $S_1$ and $S_2$. In variations on each of these methods, instead of state A and state B setting the absolute color of a pixel (e.g. black or white) they may incrementally change the color of a pixel by moving it closer to one of the extremes (e.g. incrementally moving it towards black or white). For example, if the display element has 8 different greyscale settings with 0 being white and 7 being black, when a signal is generated to drive the display element to state A (in block 1008), this may move to the next lower setting (i.e. closer to white) and when a signal is generated to drive the display element to state B (in block 1010), this may move to the next higher setting (i.e. closer to black). In other examples, however, there may be no greyscale settings and instead the display elements may increment in color along a continuous spectrum from one extreme to another based on the control signals generated.

In the examples described above with reference to FIGS. 2-12, the two sensors 106, 108 in the autonomous pixel 102 detect different external stimuli. In other examples, however, both the first sensor 106 and the second sensor 108 may detect the same external stimulus (e.g. the same wavelength or wavelength range within the electromagnetic spectrum) but the two sensors have different sensing properties (e.g. as a consequence of being a different size, shape, orientation, sensitivity to polarization and/or made from a different material, etc.).

Figure 13:
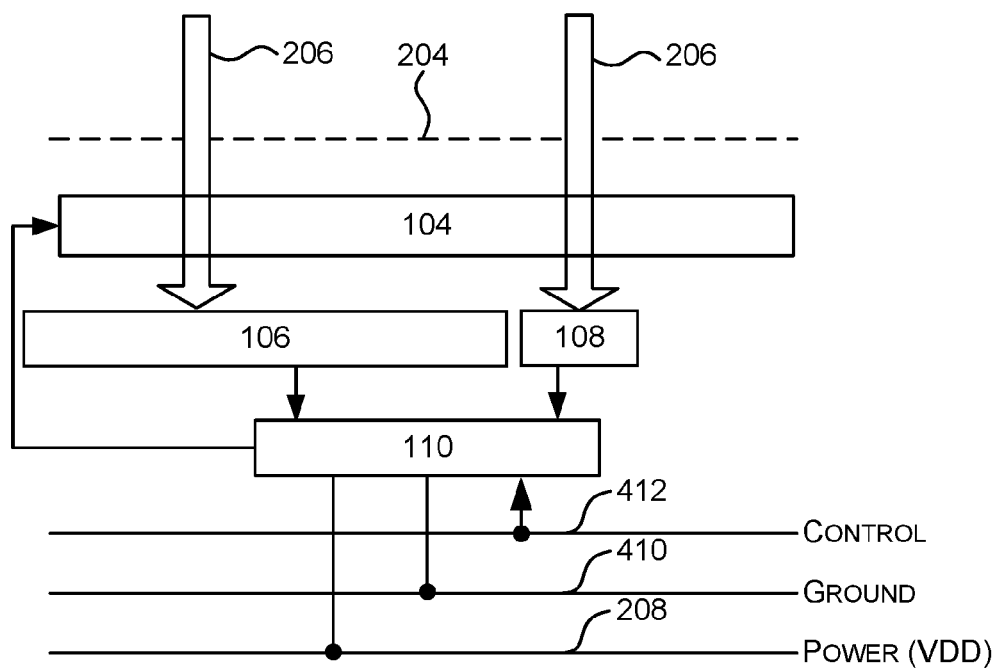
FIG. 13 is a schematic diagram of another example autonomous pixel.

In the example shown in FIG. 13, the second sensor 108 is significantly larger than the first sensor 106 (e.g. the second sensor 108 may have an area which is 10 times the area of the first sensor 106). The autonomous pixel 102 shown in FIG. 13 also comprises a display element 104, a control element 110 and a plurality of global electrical connections 208, 410, 412 (which may be electrical planes) to which all the autonomous pixels 102 in a display are connected and in the arrangement shown, each pixel connects to each rail or plane from above (e.g. using electrical vias). The global electrical connections comprise a global power rail or plane 208, a global ground rail or plane 410 and a global control rail or plane 412. The global control rail or plane 412 is connected to the control element 110 and is may be used in various different ways (e.g. to provide a global expose signal, to set a background rejection level, etc.).

Figure 14:
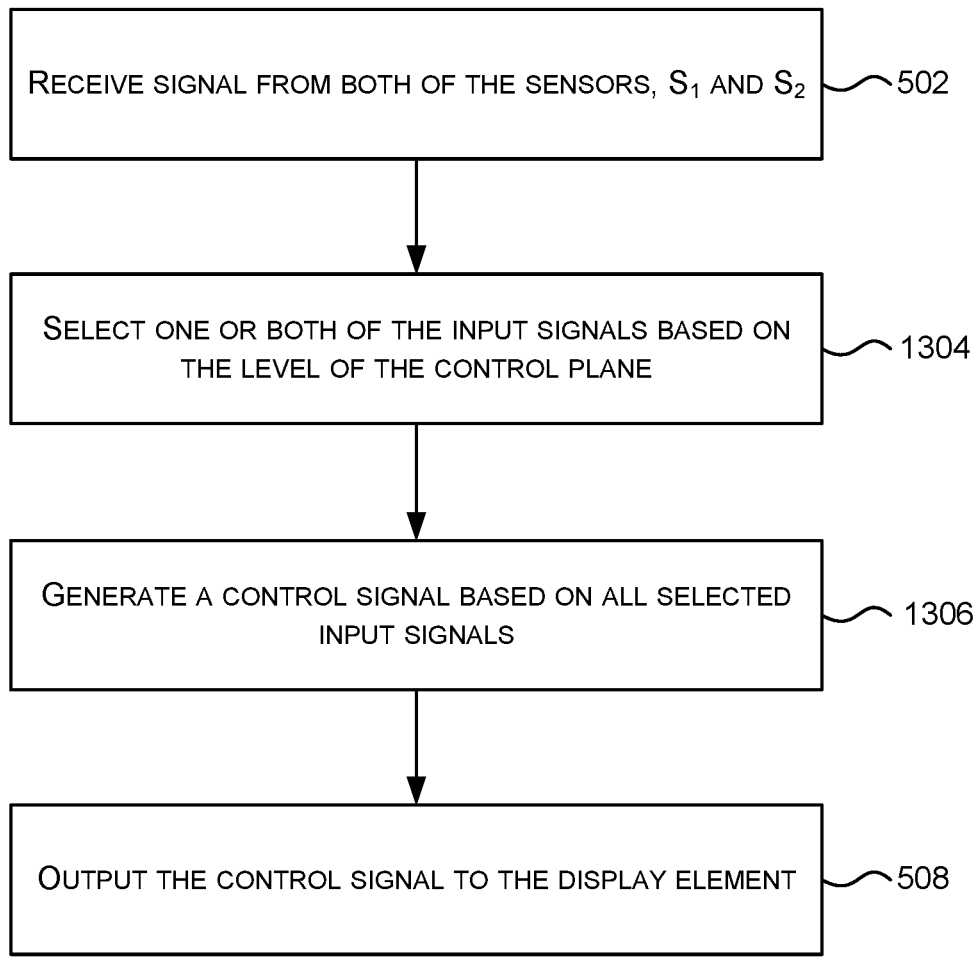
FIG. 14 is a flow diagram showing an example method of operation of an autonomous pixel such as the one shown in FIG. 13.

An example method of operation of the autonomous pixel shown in FIG. 13, and more specifically the control element 110 within the autonomous pixel, can be described with reference to the flow diagram in FIG. 14. In response to the external stimuli, the first sensor 106 generates a first sensor output signal, $S_1$, and the second sensor 106 generates a second sensor output signal, $S_2$, and these two signals are input to the control element (block 502). As the sensing properties of the two sensors 106, 108 are different the signals output from the two sensors, $S_1$ and $S_2$, and received by the control element 110 (in block 502) are not the same (e.g. in the example shown in FIG. 13, the output from the second sensor, $S_2$, may have a magnitude (or level) which is approximately 10 times the magnitude of the output from the first sensor, $S_1$).

The control element 110 selects one or both of the input signals (i.e. the signal from the first sensor 106 and/or the signal from the second sensor 108) based on a signal received from the control plane 412 (block 1404), e.g. based on a voltage level of the control plane 412, and generates a control signal based, at least in part, on all the selected input signal(s) (block 1406). As the input signals that are generated by the sensors are dependent upon the magnitude of the detected external stimulus, the control signal which is generated (in block 1406) is also based, at least in part, on the level of the external stimulus and on whether one or both sensor signals were selected (in block 1404). Consequently, the sensitivity of the autonomous pixel to the external stimulus can be changed by selecting different combinations of sensors (in block 1404). For example, if the first sensor 106 has an area (or gain) of G and the second sensor 108 has an area (or gain) of 10G, then the overall sensitivity can be set to G (by selecting only $S_1$), 10G (by selecting only $S_2$) or 11G (by selecting both $S_1$ and $S_2$). If the autonomous pixel 102 comprises more than two different sensors (e.g. with gains G, 4G, 8G), then the number of possible options for the overall increases (e.g. G, 5G, 8G, 9G, 12G or 13G). The control signal which is generated (in block 1406) is output to the display element 104 (block 508) and dependent upon the current state of the display element 104 and the level of the control signal, this may result in a change in the state of the display element 104 and hence a change in the visual appearance of the autonomous pixel.

By having two (or more) sensors with different sensing properties within a single autonomous pixel and selecting any one or more of these sensors based on a global control signal (in block 1404), the sensitivity of the autonomous pixel (and hence of a display comprising many autonomous pixels) can be varied and set globally (i.e. for all pixels in the display). This may, for example, enable the sensitivity to be varied in response to changes in the environment (e.g. ambient light levels) or for calibration purposes.

The schematic diagrams described above and shown in FIGS. 2-4, 8, 9 and 13 show connections between the sensors 106, 108 and one or more of the global connections or planes and between the control element 110 and one or more of the global connections or planes. It will be appreciated that in many of the examples, the connections between particular elements and particular planes may be swapped or changed without affecting the operating of the autonomous pixel (e.g. in FIGS. 8 and 9 the control elements 110 may instead be connected to the ground plane 410 and the sensors 106, 108 may be connected to the power plane 208).

In the examples described above with reference to FIGS. 2-14, power is provided to an autonomous pixel via a global power plane 208. In other examples, however, the power may instead be generated locally using power harvesting components 120 within the autonomous pixel 102. The power harvesting components 120 may, for example, comprise a third sensor 122 and a short-term energy store 124 (e.g. a capacitor). In some examples, the third sensor 122 may be omitted and the second sensor 108 may be used to harvest energy from the second external stimulus in addition to providing "control data" (e.g. in the examples described above with reference to FIGS. 8-12), e.g. such that the sensor 108 may be logically considered to be part of the power harvesting components 120. Use of power harvesting within an autonomous pixel may result in the omission of all global planes or some global connections may still be provided (e.g. a global control plane 412 and/or a global ground plane 412).

Figure 15:
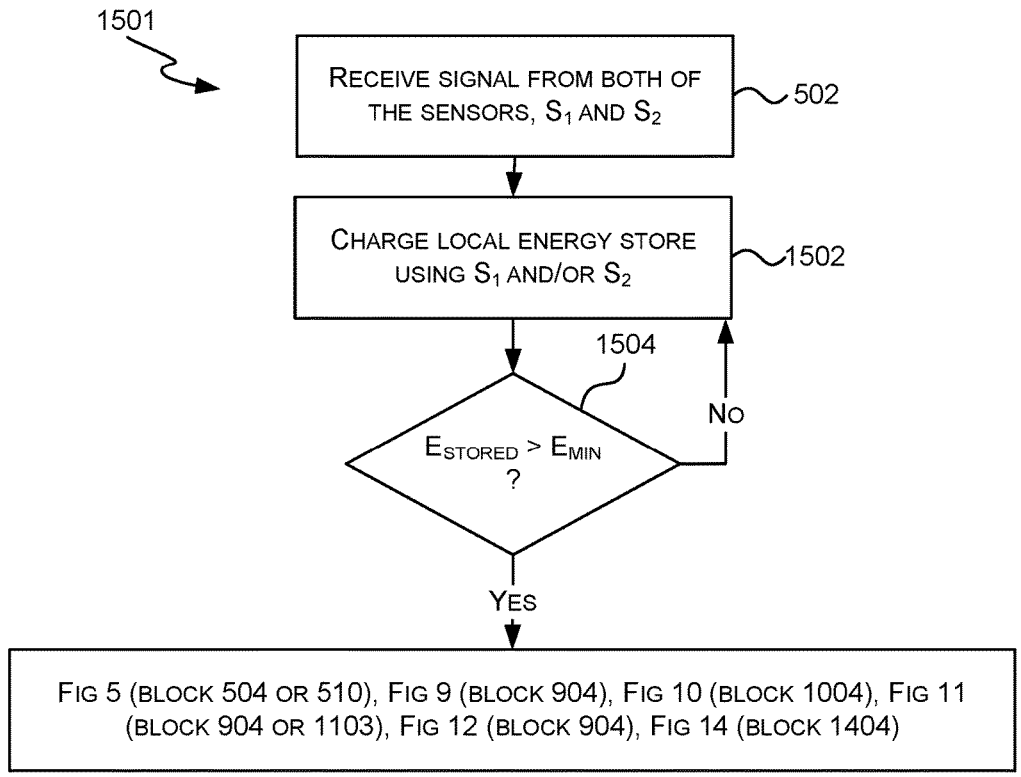
FIG. 15 is a flow diagram showing an example method of operation of an autonomous pixel comprising power harvesting hardware.
Figure 15:
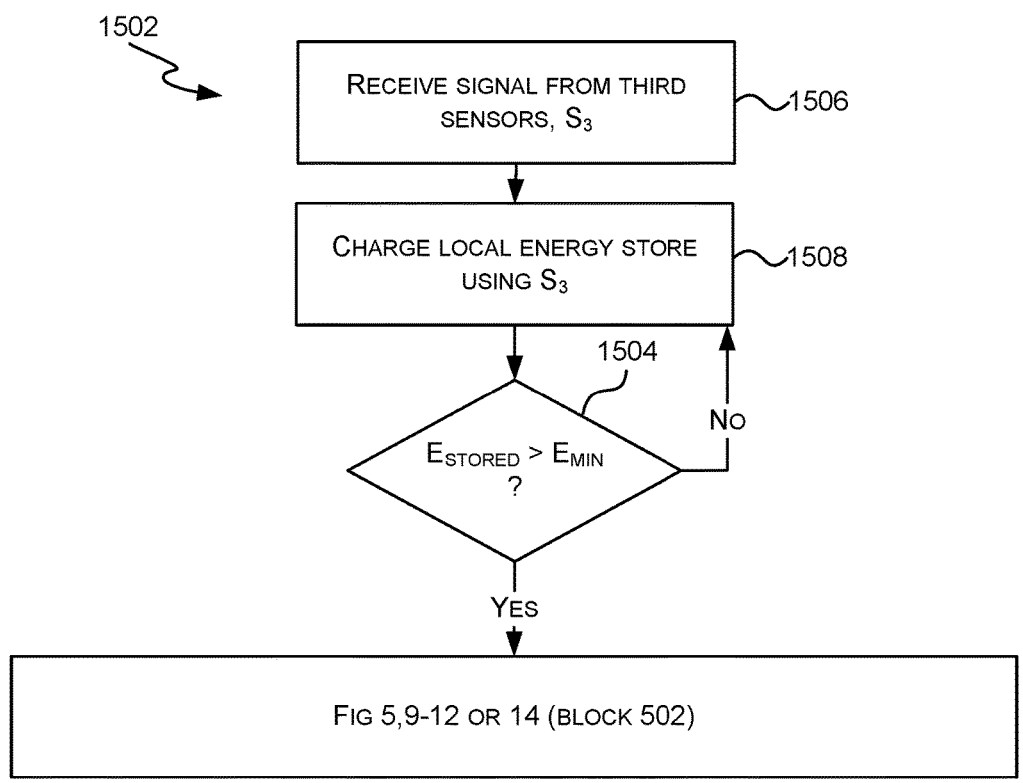

Any external stimulus may be used for power harvesting and examples include visible light, other types of electromagnetic radiation (UV, infra-red, X-ray, microwaves, RF, etc.), pressure (mechanical, acoustic, where the term 'acoustic' includes ultrasound and vibration, etc.), acceleration, capacitance, electric and magnetic fields, temperature or chemicals.

Where power harvesting is used, the methods described above with reference to FIGS. 5, 9-12 and 14 are modified slightly, as shown in FIG. 15. In the first flow diagram 1500, the signals from the first and/or second sensors are used to harvest energy and the signals received from either or both of those sensors are used to charge the short-term energy store 124 within the autonomous pixel (block 1502). Once the amount of energy stored in the short-term energy store 124, $E_{stored}$, exceeds a pre-defined amount, $E_{min}$ ('Yes in block 1504), the methods of FIGS. 5, 9-12 and 14 can proceed as described above. In the second flow diagram 1501 in FIG. 15 a third sensor is used to harvest energy and the signal, $S_3$, received from the third sensor (block 1506) is used to charge the short-term energy store 124 within the autonomous pixel (block 1508). Once the amount of energy stored in the short-term energy store 124, $E_{stored}$, exceeds a pre-defined amount, $E_{min}$ ('Yes in block 1504), the methods of FIGS. 5, 9-12 and 14 can proceed as described above (starting in all cases with block 502).

When power harvesting is used, some of the methods shown in FIGS. 5, 9-12 and 14 may be modified further (i.e. with additional modifications compared to those shown in FIG. 15). For example, the power harvesting may be used as a control signal, e.g. the method shown in FIG. 11 may be modified such that the trigger to update is provided not when $S_2$ falls below $T_3$ (in block 1105) but instead when the amount of energy stored in the short-term energy store 124, $E_{stored}$, exceeds a second pre-defined amount, $E_{trigger}$ (which may be the same as $E_{min}$ or a different amount) and hence the energy harvesting provides the expose signal. In another example, power harvested from one of the sensors may be used to put the pixel into one state (e.g. to erase the pixel) or to increment a pixel's color towards black and power harvested from the other sensor may be used to put the pixel into another state (e.g. to write to the pixel) or to increment a pixel's color towards white, e.g. in a variation on the method described above with reference to FIG. 6.

In the schematic diagrams of an autonomous pixel 102 described above, the two sensors 106, 108 and the control element 106 are layered behind the display element 104 which is close to the display face 204 of a display comprising the autonomous pixel. This arrangement (which may be described as a 'vertical stack') relies upon the display element 104 being transparent to the external stimuli (indicated by arrows 206), so that the stimulus can be detected by the sensors 106, 108, and enables pixels to be very closely packed together (e.g. because the electronics in each pixel only occupies the area behind the display element). As described above, in other examples the display element 104 may be adjacent to the sensors 106, 108.

In examples described above which include a global control plane 412, the signal or voltage level on this plane may be generated externally to any of the pixels in the display (for example, as is the case for the global power and ground planes 208, 410 which may, for example, be generated by a discrete power supply within a display). Alternatively, the signal or level on the global control plane 412 may be generated by one of the autonomous pixels 102 in the display and used by the other autonomous pixels 102 in the display. In such an example, the autonomous pixel 102 which generates the signal or level on the global control plane 412 may generate the signal or level in response to sensing an 'expose' stimulus or in response to a different trigger mechanism. In various examples, more than one or all of the autonomous pixels in the display may be capable of generating the signal or level on the global control plane 412 in response to detecting a trigger signal.

In the absence of a global control plane or "control data" provided by one of the external stimuli, each autonomous pixel 102 in a display may operate independently and different pixels may be updated at different times. In another example, instead of using a global trigger signal, pixels may be configured to automatically trigger on power-on and in this example, each autonomous pixel may operate independently but in synchronization.

Although the examples described above show a single display element 104 in each pixel (where this display element may comprise a discrete element or be part of a larger film or layer of display material) such that there is a 1:1 relationship between pixels and display elements 104, in various examples, there may be more than one display element 104 in a pixel and the state of all the display elements 104 within the autonomous pixel may be controlled together based on the control signal(s) generated by the control element 110 in the autonomous pixels.

In the examples described above each autonomous pixel in a display comprising many autonomous pixels operates autonomously, such that the state (e.g. color) of a display element is affected only by the external stimuli detected by the sensors 106, 108 in that particular pixel and any processing performed on the sensor outputs in the control element 110. There is no influence of one autonomous pixel on adjacent autonomous pixels in the display (each one operates identically but independently) and control signals are therefore generated locally on a per-pixel basis (and so the identical operation may lead to different colors of the display elements).

In a variation on the examples described above, a pixel may be influenced by its neighbor pixels such that the control signal which is generated within the control element to drive the display element is based on the external stimuli sensed locally (i.e. within the pixel) and in addition also on the external stimuli sensed by one or more proximate autonomous pixels. For example, the control signal may be based on the external stimuli sensed locally and the external stimuli sensed by those pixels which are immediately adjacent to the particular pixel.

Although the present examples are described and illustrated herein as being implemented in a display as shown in FIG. 1 with circular pixels, the system described is provided as an example and not a limitation. As those skilled in the art will appreciate, the present examples are suitable for application in a variety of different types of display systems and different shaped pixels may be used (e.g. triangular, square, hexagonal or irregular shaped pixels such as where the pixels are arranged according to a Voronoi tessellation). The display system may be planar or curved and as described above may be a non-developable surface. Some displays may comprise a small number of pixels (e.g. tens of pixels) and other displays may comprise a very large number of pixels (e.g. from many thousands to many millions of pixels). In many examples the pixel size may be very small (e.g. such that the display has a resolution of 300 pixels-per-inch or more); however, in other examples, much larger pixel sizes (e.g. pixel diameters of several millimeters or centimeters) may be used. Furthermore, although various aspects are described with reference to the specific implementations shown in FIGS. 2-15, these aspects may be used in other examples.

Using the autonomous pixels described herein, displays may be fabricated with pixels in any arrangement and on surfaces of any complexity (as long as the manufacturing process can fabricate the signal and power stack onto it). In examples where random or pseudo-random pixel placement is used, the display will not suffer from moiré or other aliasing artifacts which standard rectilinear pixel arrangements experience.

The autonomous pixels described herein may be used to create displays of any size and shape and these displays may be used for any application. Example applications include, but are not limited to, displays on highly contoured or irregular surfaces (e.g. on the exterior of a vehicle or other object), displays on wearable devices, toys, game pieces or cards, etc.

Many different fabrication methods or techniques may be used to make a display comprising the autonomous pixels described herein including, but not limited to, roll-to-roll methods, laser cutting, vacuum forming, robot placement of pixels and spray placement of pixels.

Many of the examples described above show two heterogeneous sensors in each autonomous pixel. In variations of the examples described above, an autonomous pixel may comprise one or more additional sensors and the methods described above may be modified accordingly (e.g. such that the control element 110 receives a signal from each of the sensors in the pixel in block 502). Furthermore, whilst many of the examples are described with reference to a display element 104 having two possible states (e.g. black and white), in variations of the examples described above, the display element 104 may have more than two possible states (e.g. it may provide a greyscale or color visual output). As described above, the display element 104 may be bi-stable or multi-stable or may require a permanent power supply to maintain its state. Where power harvesting is used, this may be used with any type of display element; however, where it is used in combination with a bi-stable or multi-stable display element, the pixel retains its state when no power is being harvested and power harvesting is only required to change the state of the display element. In various examples, an autonomous pixel may comprise two display elements, one which is bi-stable or multi-stable and one which is an emissive display element. In such an example, power harvesting (e.g. using a solar cell) may be used during the day and during the day the non-emissive display element may be used (e.g. updated by the control element 110). At night, the emissive display element may be powered and updated by the control element 110 using the power harvested during the day.

A first further example provides an autonomous pixel comprising: a display element; a plurality of different sensors arranged to detect one or more external stimuli; and a control element arranged to generate, entirely within the autonomous pixel, a control signal to drive the display element based, at least in part, on a magnitude of an external stimulus detected by one or more of the different sensors.

A second further example provides an autonomous pixel comprising: a display element; a plurality of different sensors arranged to detect one or more external stimuli; and means for generating, entirely within the autonomous pixel, a control signal to drive the display element based, at least in part, on a magnitude of an external stimulus detected by one or more of the different sensors.

In various examples the means for generating a control signal is the control element 110 shown in FIG. 1 as described above and may be implemented using one or more transistors (e.g. as shown in FIG. 3). In various examples, the means for generating the control signal may comprise a pixel driver 112 and pixel controller 114 as shown in FIG. 1 and/or may be implemented as shown in FIG. 9.

In the first and second examples, the plurality of different sensors may comprise: a first sensor arranged to detect a first external stimulus; and a second sensor arranged to detect a second external stimulus, wherein the first and second external stimuli are different.

In the first and second examples, the autonomous pixel may have a first operating mode and a second operating mode, wherein in the first operating mode, the control element is arranged to generate, entirely within the autonomous pixel, a control signal to drive the display element based, at least in part, on a magnitude of the first external stimulus detected by the first sensor and in the second operating mode, the control element is arranged to generate, entirely within the autonomous pixel, a control signal to drive the display element based, at least in part, on a magnitude of the second external stimulus detected by the second sensor.

In the first and second examples, the autonomous pixel may further comprise: a connection between the first sensor and a first global signal line; and a connection between the second sensor and a second global signal line, and wherein the autonomous pixel is arranged to switch operating modes dependent upon a voltage level received via one or both of the global signal lines.

In the first and second examples, the autonomous pixel may be arranged to switch operating modes dependent upon which of the global signal lines is connected to ground.

In the first and second examples, the autonomous pixel may further comprise: a connection between the control element and a global control line, and wherein the control element is arranged to switch operating modes dependent upon a voltage level received via the global control line. The control element may be arranged to switch operating modes by selecting an input from either the first sensor or the second sensor and to generate, entirely within the autonomous pixel, a control signal to drive the display element based, at least in part, on the magnitude of the selected input.

In the first and second examples, the first sensor may be responsive to a part of the electromagnetic spectrum and the second sensor may be a touch sensor.

In the first and second examples, the control element may be arranged to generate, entirely within the autonomous pixel, a control signal to drive the display element based, at least in part, on the magnitudes of both the first external stimulus as detected by the first sensor and the second external stimulus detected by the second sensor.

In the first and second examples, the control element may be arranged to generate a control signal to drive the display element to a first state based, at least in part, on the magnitude of the first external stimulus as detected by the first sensor and to generate a control signal to drive the display element to a second state based, at least in part, on the magnitude of the second external stimulus as detected by the second sensor.

In the first and second examples, the control element may be arranged to generate a control signal to drive the display element in response to the magnitude of the first external stimulus as detected by the first sensor exceeding a first threshold level and the magnitude of the second external stimulus as detected by the second sensor exceeding a second threshold level. The first and second thresholds may be the same or different.

In the first and second examples, the control element may be arranged to generate one or more control parameters based, at least in part, on a magnitude of the second external stimulus detected by the second sensor and to generate a control signal to drive the display element based, at least in part, on both the magnitude of the first external stimulus detected by the first sensor and the one or more control parameters.

In the first and second examples, the control element may be arranged to generate a control parameter having a first value in response to a magnitude of the second external stimulus detected by the second sensor exceeding a pre-defined threshold level and having a second value in response to the magnitude of the second external stimulus detected by the second sensor not exceeding the predefined threshold level and wherein a control signal to drive the display element is generated based, at least in part, on the magnitude of the first external stimulus detected by the first sensor only if the control parameter has the first value.

In the first and second examples, the one or more control parameters may comprise a threshold level and wherein the control element is arranged to generate a control signal to drive the display element to a first state in response the magnitude of the first external stimulus detected by the first sensor exceeding the threshold level and to generate a control signal to drive the display element to a second state in response the magnitude of the first external stimulus detected by the first sensor not exceeding the threshold level.

In the first and second examples, the one or more control parameters may comprise a first threshold level and wherein the control element is arranged to generate a control signal to drive the display element to a first state in response the magnitude of the second external stimulus detected by the second sensor exceeding a second, pre-defined, threshold level and subsequently, in response to the magnitude of the second external stimulus detected by the second sensor falling below a third, pre-defined, threshold level, to generate a control signal to drive the display element to a second state in response the magnitude of the first external stimulus detected by the first sensor exceeding the first threshold level.

In the first and second examples, the control element may be arranged to generate a control parameter having a first value in response to a magnitude of the second external stimulus detected by the second sensor exceeding a first predefined threshold level and having a second value in response to the magnitude of the second external stimulus detected by the second sensor not exceeding the first pre-defined threshold level and wherein a control signal to drive the display element to a first state is generated if the control parameter has the first value and the magnitude of the first external stimulus detected by the first sensor exceeds a second predefined threshold level and a control signal to drive the display element to a second state is generated if the control parameter has the second value and the magnitude of the first external stimulus detected by the first sensor exceeds the second predefined threshold level.

In the first and second examples, the plurality of different sensors may comprise: a first sensor and a second sensor both arranged to detect a first external stimulus, wherein the first and second have different sensing properties. The first and second sensors may be of different sizes.

In the first and second examples, the control element may be arranged to select an input signal from one or both of the first and second sensors and to generate, entirely within the autonomous pixel, a control signal to drive the display element based, at least in part, on a magnitude of each of the selected input signals.

In the first and second examples, the autonomous pixel may further comprise a power harvesting element.

A display may comprise a plurality of autonomous pixels according to the first or second example.

A display may comprise a plurality of autonomous pixels according to the first or second example, wherein each autonomous pixel further comprises a power harvesting element (120) and there are no electrical connections between autonomous pixels.

A third further example provides a method of operating an autonomous pixel comprising a display element, a first sensor arranged to detect a first external stimulus, a second sensor arranged to detect a second external stimulus and a control element, the method comprising: generating, in the control element and entirely within the autonomous pixel, a control signal to drive the display element based, at least in part, on a magnitude of an external stimulus detected by one or more of the different sensors.

The method may comprise: in first operating mode, generating, in the control element and entirely within the autonomous pixel, a control signal to drive the display element based, at least in part, on a magnitude of the first external stimulus detected by the first sensor and in a second operating mode, generating, in the control element and entirely within the autonomous pixel, a control signal to drive the display element based, at least in part, on a magnitude of the second external stimulus detected by the second sensor. The method may further comprise: switching between the first and second operating modes dependent upon a voltage level received in the control element from a global control line or switching between the first and second operating modes by selecting an input from either the first sensor or the second sensor, and wherein the control signal is generated based, at least in part, on the magnitude of the selected input.

The control signal may be generated based, at least in part, on the magnitudes of both the first external stimulus as detected by the first sensor and the second external stimulus detected by the second sensor.

Generating the control signal may comprise: generating a control signal to drive the display element to a first state based, at least in part, on the magnitude of the first external stimulus as detected by the first sensor; and generating a control signal to drive the display element to a second state based, at least in part, on the magnitude of the second external stimulus as detected by the second sensor.

Generating the control signal may comprise: generating a control signal to drive the display element in response to the magnitude of the first external stimulus as detected by the first sensor exceeding a first threshold level and the magnitude of the second external stimulus as detected by the second sensor exceeding a second threshold level.

Generating the control signal may comprise: generating one or more control parameters based, at least in part, on a magnitude of the second external stimulus detected by the second sensor; and generating a control signal to drive the display element based, at least in part, on both the magnitude of the first external stimulus detected by the first sensor and the one or more control parameters. Generating one or more control parameters may comprise: generating a control parameter having a first value in response to a magnitude of the second external stimulus detected by the second sensor exceeding a predefined threshold level and having a second value in response to the magnitude of the second external stimulus detected by the second sensor not exceeding the predefined threshold level. Alternatively, generating one or more control parameters may comprise: generating a control signal to drive the display element to a first state in response the magnitude of the first external stimulus detected by the first sensor exceeding the threshold level; and generating a control signal to drive the display element to a second state in response the magnitude of the first external stimulus detected by the first sensor not exceeding the threshold level.

The one or more control parameters may comprise a first threshold level and generating the control signal may comprise: generating a control signal to drive the display element to a first state in response the magnitude of the second external stimulus detected by the second sensor exceeding a second, pre-defined, threshold level; and subsequently, in response to the magnitude of the second external stimulus detected by the second sensor falling below a third, pre-defined, threshold level, generating a control signal to drive the display element to a second state in response the magnitude of the first external stimulus detected by the first sensor exceeding the first threshold level.

Generating one or more control parameters may comprise: generating a control parameter having a first value in response to a magnitude of the second external stimulus detected by the second sensor exceeding a first predefined threshold level and having a second value in response to the magnitude of the second external stimulus detected by the second sensor not exceeding the first predefined threshold level, and wherein generating the control signal comprises: generating a control signal to drive the display element to a first state in response to the control parameter having the first value and the magnitude of the first external stimulus detected by the first sensor exceeding a second predefined threshold level; and generating a control signal to drive the display element to a second state in response to the control parameter having the second value and the magnitude of the first external stimulus detected by the first sensor exceeding the second predefined threshold level.

The first and second external stimuli may be different.

The first and second external stimuli may be the same and generating the control signal may comprise: selecting an input signal from one or both of the first and second sensors; and generating a control signal to drive the display element based, at least in part, on a magnitude of each of the selected input signals.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An autonomous pixel comprising:
    a display element;
    a plurality of different sensors arranged to detect one or more external stimuli;
    a control element arranged to generate, entirely within the autonomous pixel, a control signal to drive the display element based, at least in part, on a magnitude of an external stimulus detected by one or more of the different sensors, and
    a power harvesting element, wherein there are no electrical connections between the autonomous pixel and other autonomous pixels.

2. The autonomous pixel according to claim 1, wherein the plurality of different sensors comprises:
    a first sensor arranged to detect a first external stimulus; and
    a second sensor arranged to detect a second external stimulus,
    wherein the first and second external stimuli are different.

3. The autonomous pixel according to claim 2, having a first operating mode and a second operating mode, wherein in the first operating mode, the control element is arranged to generate, entirely within the autonomous pixel, a control signal to drive the display element based, at least in part, on a magnitude of the first external stimulus detected by the first sensor and in the second operating mode, the control element is arranged to generate, entirely within the autonomous pixel, a control signal to drive the display element based, at least in part, on a magnitude of the second external stimulus detected by the second sensor.

4. The autonomous pixel according to claim 3, further comprising:
    a connection between the first sensor and a first global line and a connection between the second sensor and a second global line; or
    a connection between the control element and a third global line,
    and wherein the autonomous pixel is arranged to switch operating modes dependent upon a voltage level received via one or more of the global lines.

5. The autonomous pixel according to claim 2, wherein the control element is arranged to generate, entirely within the autonomous pixel, a control signal to drive the display element based, at least in part, on the magnitudes of both the first external stimulus as detected by the first sensor and the second external stimulus detected by the second sensor.

6. The autonomous pixel according to claim 5, wherein the control element is arranged to generate a control signal to drive the display element to a first state based, at least in part, on the magnitude of the first external stimulus as detected by the first sensor and to generate a control signal to drive the display element to a second state based, at least in part, on the magnitude of the second external stimulus as detected by the second sensor.

7. The autonomous pixel according to claim 5, wherein the control element is arranged to generate a control signal to drive the display element in response to the magnitude of the first external stimulus as detected by the first sensor exceeding a first threshold level and the magnitude of the second external stimulus as detected by the second sensor exceeding a second threshold level.

8. The autonomous pixel according to claim 5, wherein the control element is arranged to generate one or more control parameters based, at least in part, on a magnitude of the second external stimulus detected by the second sensor and to generate a control signal to drive the display element based, at least in part, on both the magnitude of the first external stimulus detected by the first sensor and the one or more control parameters.

9. The autonomous pixel according to claim 8, wherein the control element is arranged to generate a control parameter having a first value in response to a magnitude of the second external stimulus detected by the second sensor exceeding a predefined threshold level and having a second value in response to the magnitude of the second external stimulus detected by the second sensor not exceeding the predefined threshold level and wherein a control signal to drive the display element is generated based, at least in part, on the magnitude of the first external stimulus detected by the first sensor only if the control parameter has the first value.

10. The autonomous pixel according to claim 8, wherein the one or more control parameters comprises a threshold level and wherein the control element is arranged to generate a control signal to drive the display element to a first state in response the magnitude of the first external stimulus detected by the first sensor exceeding the threshold level and to generate a control signal to drive the display element to a second state in response the magnitude of the first external stimulus detected by the first sensor not exceeding the threshold level.

11. The autonomous pixel according to claim 8, wherein the one or more control parameters comprises a first threshold level and wherein the control element is arranged to generate a control signal to drive the display element to a first state in response the magnitude of the second external stimulus detected by the second sensor exceeding a second, pre-defined, threshold level and subsequently, in response to the magnitude of the second external stimulus detected by the second sensor falling below a third, pre-defined, threshold level, to generate a control signal to drive the display element to a second state in response the magnitude of the first external stimulus detected by the first sensor exceeding the first threshold level.

12. The autonomous pixel according to claim 8, wherein the control element is arranged to generate a control parameter having a first value in response to a magnitude of the second external stimulus detected by the second sensor exceeding a first predefined threshold level and having a second value in response to the magnitude of the second external stimulus detected by the second sensor not exceeding the first predefined threshold level and wherein a control signal to drive the display element to a first state is generated if the control parameter has the first value and the magnitude of the first external stimulus detected by the first sensor exceeds a second predefined threshold level and a control signal to drive the display element to a second state is generated if the control parameter has the second value and the magnitude of the first external stimulus detected by the first sensor exceeds the second predefined threshold level.

13. The autonomous pixel according to claim 1, wherein the plurality of different sensors comprises:
a first sensor and a second sensor both arranged to detect a first external stimulus,
wherein the first and second have different sensing properties.

14. The autonomous pixel according to claim 13, wherein the control element is arranged to select an input signal from one or both of the first and second sensors and to generate, entirely within the autonomous pixel, a control signal to drive the display element based, at least in part, on a magnitude of each of the selected input signals.

15. A display comprising a plurality of autonomous pixels, each autonomous pixel comprising:
a display element;
a plurality of different sensors arranged to detect one or more external stimuli;
a control element arranged to generate, entirely within the autonomous pixel, a control signal to drive the display element based, at least in part, on a magnitude of an external stimulus detected by one or more of the different sensors, and
a power harvesting element, wherein there are no electrical connections between the autonomous pixels.

16. The display according to claim 15, wherein the plurality of different sensors comprises:
a first sensor arranged to detect a first external stimulus; and
a second sensor arranged to detect a second external stimulus,
wherein the first and second external stimuli are different.

17. A method of operating an autonomous pixel comprising a display element, a power harvesting element, a first sensor arranged to detect a first external stimulus, a second sensor arranged to detect a second external stimulus, and a control element, the method comprising:
generating, in the control element and entirely within the autonomous pixel, a control signal to drive the display element based, at least in part, on a magnitude of the first external stimulus detected by the first sensor and/or the second external stimulus detected by the second sensor, wherein there are no electrical connections between the autonomous pixel and other autonomous pixels.

18. The method according to claim 17, comprising, in a first operating mode generating, in the control element and entirely within the autonomous pixel, a control signal to drive the display element based, at least in part, on a magnitude of the first external stimulus detected by the first sensor and in a second operating mode, generating, in the control element and entirely within the autonomous pixel, a control signal to drive the display element based, at least in part, on a magnitude of the second external stimulus detected by the second sensor.

19. The method according to claim 17, wherein the control signal is generated based, at least in part, on the magnitudes of both the first external stimulus as detected by the first sensor and the second external stimulus detected by the second sensor.

20. The method according to claim 17, wherein the first and second external stimuli are the same and generating the control signal comprises:
selecting an input signal from one or both of the first and second sensors;
generating a control signal to drive the display element based, at least in part, on a magnitude of each of the selected input signals.

* * * * *